United States Patent [19]
Vinciarelli et al.

[11] Patent Number: 5,572,417
[45] Date of Patent: Nov. 5, 1996

[54] AC TO DC BOOST POWER CONVERTERS

[75] Inventors: Patrizio Vinciarelli, Boston; Jay Prager, Tyngsboro, both of Mass.

[73] Assignee: VLT Corporation, San Antonio, Tex.

[21] Appl. No.: 274,991

[22] Filed: Jul. 13, 1994

[51] Int. Cl.$^6$ .................................................. H02M 7/04
[52] U.S. Cl. ............................ 363/89; 323/222; 323/235
[58] Field of Search ............................ 363/89, 125, 126, 363/127; 323/222, 235, 239, 351, 282, 271

[56] References Cited

U.S. PATENT DOCUMENTS

| | | | |
|---|---|---|---|
| 4,138,715 | 2/1979 | Miller | 363/28 |
| 4,437,146 | 3/1984 | Carpenter | 363/21 |
| 4,479,175 | 10/1984 | Gille et al. | 363/41 |
| 4,542,451 | 9/1985 | Hucker | 363/132 |
| 4,648,020 | 3/1987 | Vinciarelli | 363/71 |
| 4,677,366 | 6/1987 | Wilkinson et al. | 323/222 |
| 4,720,667 | 1/1988 | Lee et al. | 323/271 |
| 4,720,668 | 1/1988 | Lee et al. | 323/271 |
| 4,829,232 | 5/1989 | Erickson, Jr. | 323/290 |
| 4,841,220 | 6/1989 | Tabisz et al. | 323/282 |
| 4,894,621 | 1/1990 | Koenig et al. | 330/251 |
| 4,949,929 | 8/1990 | Kesselman et al. | 248/300 |
| 5,216,352 | 6/1993 | Studtman et al. | 323/241 |
| 5,321,348 | 6/1994 | Vinciarelli et al. | 323/222 |
| 5,343,140 | 8/1994 | Gegner | 323/222 |

OTHER PUBLICATIONS

Vinciarelli, Patrizio, "High Efficiency Floating Gate Driver Circuit Using Leakage–Inductance Transformer", Serial No. 07/805,474, filed Dec. 11, 1991, patent application.

Liu et al., "Resonant Switches—A Unified Approach to Improve Performances of Switching Converters", IEEE Catalog No. 84CH2073–55, 1984, pp. 344–350.

Enjeti et al., "A Two Quadrant High Power Quality Rectifier", Power Conversion Oct. 1990 Proceedings, pp. 86–91.

Unitrode Application Note U–129, "UC3907 Load Share IC Simplifies Parallel Power Supply Design, Unitrode Product and Applications Handbook", 1993–1994, pp. 9–296—9–305.

*Primary Examiner*—Peter S. Wong
*Assistant Examiner*—Adolf Berhane
*Attorney, Agent, or Firm*—Fish & Richardson PC

[57] ABSTRACT

AC-DC boost switching power conversion apparatus delivers power from a bipolar input voltage source to a load at a unipolar load voltage without including rectifiers directly in the path of the current which is delivered from the input source. By this means the converter exhibits lower power loss in semiconductor diodes and switches than is exhibited by prior art converters which interpose a rectifier between a bipolar source and a DC-DC boost converter. Power processing is performed by circuitry of the kind which includes an inductive element in series with the bipolar input source, shunt paths which include switching elements for recirculating a bipolar shunt current back toward the input source, a controller for turning the switching elements on and off during each of a series of converter operating cycles and rectification elements which are arranged to deliver a unipolar current to the load. The switching elements may be bipolar switches, which can block a voltage of either polarity when on, and conduct a current of either polarity when off. In zero-current switching embodiments the converter includes circuit elements, such as inductors and capacitors, which allow for turning the switching elements on and off at zero current. One class of AC-DC converters, called "fully integrated boost bridge converters," may be used to construct converter arrays of arbitrary size in which each individual converter within the array will share both in the power delivered to the load and in the current withdrawn from, and returned to, the bipolar input source.

34 Claims, 24 Drawing Sheets

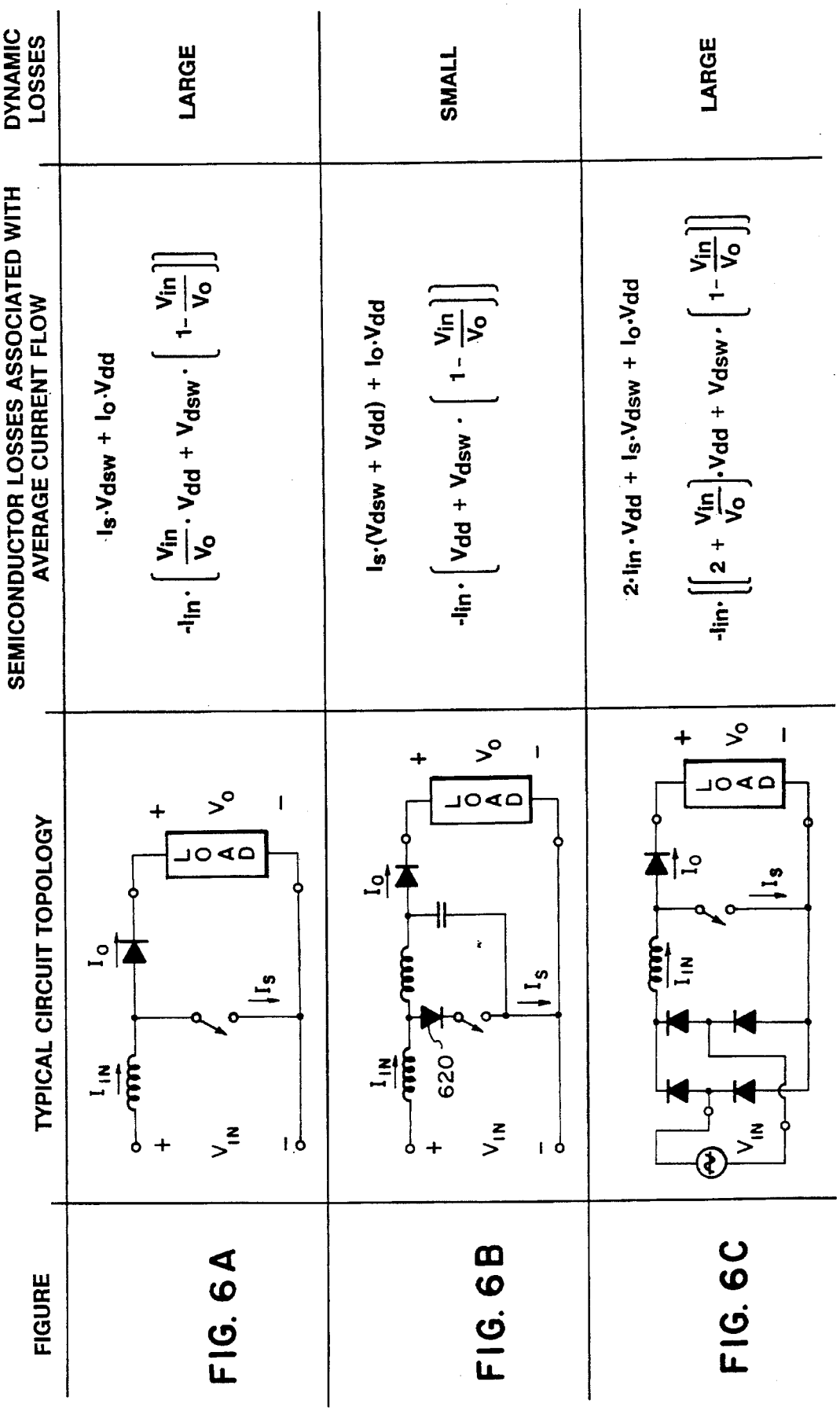

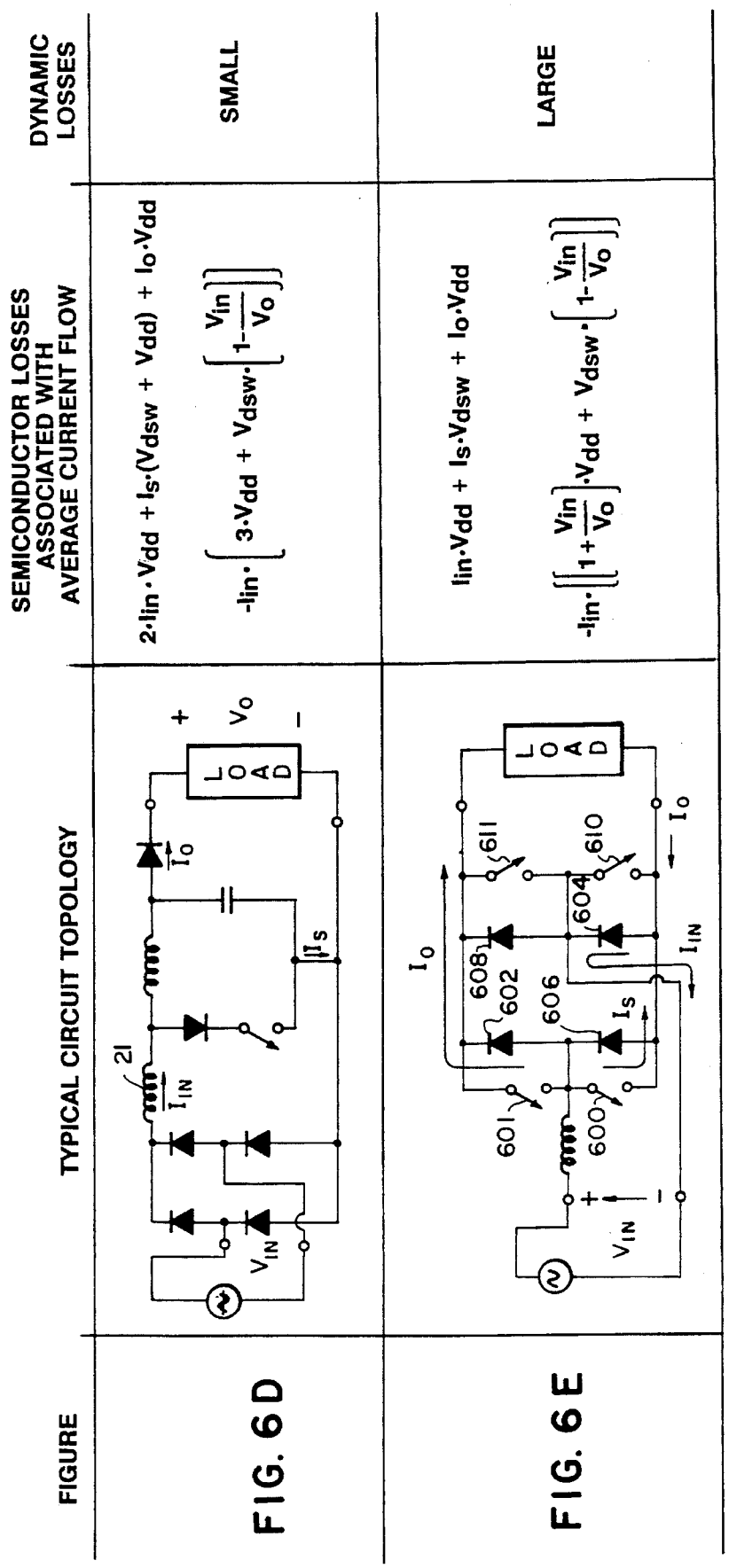

AC TO DC BOOST POWER CONVERTERS

BACKGROUND

This invention relates to AC to DC boost power conversion.

Non-isolated AC to DC boost converters accept a bipolar voltage from an AC input source and deliver a unipolar voltage to a load 18 at a load voltage greater than the instantaneous value of the voltage delivered by the AC source. "Non-isolated" means that the output of the converter is not galvanically isolated from the converter input source. Such converters are useful, for example, where a load (e.g., an isolated DC-DC converter) must be supplied with an operating voltage which is greater in magnitude than the DC voltage which could otherwise be delivered by simply rectifying and filtering the AC source. AC to DC boost converters also find use as power factor correcting preregulators. Such preregulators are controlled to maintain their output voltage at some desired unipolar value while simultaneously forcing the waveform of the current drawn from the AC source to follow the waveform of the AC source voltage. In general, AC to DC boost converters are useful in applications in which power is to be delivered from a bipolar input voltage source to a load which requires a unipolar voltage at a voltage value which is greater than the magnitude of the input source.

As illustrated in FIG. 1A, AC to DC converters have conventionally been implemented by interposing a full-wave rectifier 12 between the AC input source 14 and the input of a DC-DC boost converter 10. The rectifier 12 transforms the bipolar voltage of the AC input source 14 into a unipolar rectified voltage, Vr, suitable for powering the DC-DC boost converter. When Vr is less than Vout, the boost converter is controlled (e.g., by controller 16, which varies the timing of the opening and closing of switching elements within the boost converter 10) to maintain Vout at some desired value above Vr. In applications in which both AC to DC conversion and power factor correction are desired, the controller 16 will simultaneously control both the converter output voltage, Vout, and the waveform of the input current, Iin, such that the waveform of the current drawn from the AC source 14 follows the waveform of the AC source voltage. Examples of power factor correcting AC to DC converters are shown in Wilkerson, et al, "Unity Power Factor Power Supply," U.S. Pat. No. 4,677,366; Williams, "AC to DC Converter With Unity Power Factor," U.S. Pat. No. 4,949,929; and in Carpenter, "Boost Power Supply Having Power Factor Correction Circuit," U.S. Pat. No. 4,437,146.

Many kinds of DC-DC boost converters are known, some examples of which are illustrated in FIGS. 2A through 2D. FIG. 2A shows a pulse width modulated ("PWM") DC-DC boost converter 20; FIGS. 2B and 2C show zero-current switching ("ZCS") DC-DC boost converters 30, 40 using discrete inductors 21, 36, 46; FIG. 2D shows a DC-DC boost converter using a coupled inductor 56. All of the converters shown are of a kind, referred to herein as "shunt boost converters," which operate from a unipolar input source and deliver a unipolar output and which include a switching element 22, 32, 42, 52 in a path which carries a shunt current, Is, back toward the input source when the switch is closed and in which power may flow from the source to the load when the switch is opened. These, and other shunt boost converter embodiments, including zero-voltage switching DC-DC boost converters, are described or illustrated in Miller, "Resonant Switching Converter," U.S. Pat. No. 4,138,715; Lee, et al, "Zero-Current Switching Quasi-Resonant Converters Operating in a Full-Wave Mode," U.S. Pat. No. 4,720,667; Lee, et al, "Zero-Voltage Switching Quasi-Resonant Converters," U.S. Pat. No. 4,720,668; Liu, et al, "Resonant Switches—A Unified Approach to Improve Performance of Switching Regulators," IEEE International Telecommunications Energy Conference, 1984 Proceedings, pp. 344–351; Tabisz, et al, "DC-to-DC Converters Using Multi-Resonant Switches," U.S. Pat. No. 4,841,220; and in Vinciarelli, "Boost Switching Power Conversion," U.S. Pat. No. 5,321,348.

All of the shunt boost converters of FIG. 2 share similar principles of operation. An inductive input element (e.g., discrete inductors 21 in FIGS. 2A, 2B and 2C or the effective inductance of coupled inductor 56 in FIG. 2D) in series with the input source, Vin, exhibits a current-sourcing characteristic relative to the converter output. A switch (e.g., switches 22, 32, 42, 52) is closed during a portion of each of a series of operating cycles, resulting in a flow of shunt current, Is, which recirculates, without loss, back toward the source and away from the converter output. This results in a pulsating output current, Io, which is filtered by an output capacitor 25. Neglecting losses in circuit elements, conservation of power and Kirchoff's current and voltage laws demand that, under steady state operating conditions, Pin=Vin*Iin=Pout=Vout*Io; Iin=Is+Io; and Vs=Vin (so that the average voltage across the input inductive element is zero), where Iin, Io, Is, Vin, Vs and Vout are values which are averaged over many converter operating cycles. Under steady state conditions, Vout will be greater than Vin, Iin will be greater than Io, and, for a given amount of power throughput, and a particular output voltage, Vout, a reduction in Vin will result in an increase in both Iin and Is.

By switching at zero current, and by limiting the rate-of-change of current which can occur in the output rectifier 24, zero-current switching DC-DC boost converters, of the kind shown in FIGS. 2B through 2D, essentially eliminate both the switching losses (associated with turning a switch on or off when current is flowing in the switch) and reverse recovery losses (associated with rapid application of reverse voltage across a forward conducting diode) which are present in the PWM converter of FIG. 2A. This not only results in improved converter operating efficiency (i.e., the fraction of the average power withdrawn from the input source which is delivered to the load), it also allows for increased converter operating frequency and a reduction in the size of the inductors and capacitors used in the converter.

In general, known zero-current switching boost DC-DC converters may be operated in a variety of modes which differ in terms of how many zero-crossings are allowed to occur between switch closure and switch turn-off (at a zero crossing). In one such mode, called the "short cycle" (or "half wave") mode, the switch is turned off at the first zero crossing following turn-on. Waveforms which illustrate the operation of a converter of the kind shown in FIG. 2C operating in the short-cycle mode, having a value of input inductor 21, L1, which is very large relative to the value of the value of inductor 46, L, so that variations in Iin during an operating cycle are essentially negligible, are shown in FIGS. 3A through 3D. As discussed in the cited references, the operating frequency of a zero-current switching shunt boost converter operating in this mode is a function of both converter loading and input voltage. Also, the switch in a short-cycle converter must withstand a negative voltage for a portion of the operating cycle following turn-off (FIG. 3A). In practice, switches which can block both positive and negative voltages are not yet generally available so, as illustrated in FIG. 5A, a diode 29 is typically placed in series with a unidirectional switch 31 to provide bidirectional blocking capability in short-cycle converters. In another operating mode, called the "long cycle" (or "full wave") mode, the switch is turned off at the second zero crossing following turn-on. Waveforms for a converter of the kind shown in FIG. 2C, under circuit conditions similar to those described above for FIG. 3, are shown in FIGS. 4A through 4D. The operating frequency of such a converter will vary with input voltage but is only weakly dependent upon converter loading. The switch in a long-cycle converter need not have bidirectional blocking capability but must be capable of bidirectional current conduction (e.g., note the current reversal in FIG. 4C). Such a switch is often embodied as a unidirectional switch 31 and a parallel diode 33, as shown in FIG. 5B. The waveforms shown in FIGS. 3 and 4 are representative of the nature of the waveforms found in any zero-current switching shunt boost converter operating in the short and long cycle modes, respectively. In either operating mode, the characteristic time scale, T, for the sinusoidal variations in the voltages and currents during each operating cycle is determined by the values of inductor 46, L, and capacitor 34, C. The values of L, C and Vo also determine the peak deviation in switch current, Ip, during an operating cycle and this sets an upper limit on the average value of Is (and hence the maximum converter power rating) since the switch current will return to zero only if Iin is less than Ip.

Rectification of bipolar voltages using PWM controlled arrangements of bridge-configured switches is also known. One such circuit, shown in FIG. 1B, is described in Enjeti, et al, "A Two Quadrant High Power Quality Rectifier," PCIM '90 U.S.A., Official Proceedings of the 21st International Power Conversion Conference, pp. 86–91. By appropriate control of the switches 2,4,6,8 in the circuit of FIG. 1B, both power factor correction and bidirectional power flow (e.g., between the AC source 14 and the load 18 and vice versa) can be achieved.

It is known to arrange multiple power converters to share predictably in delivering power to a load. Power sharing between quantized energy converters (e.g., ZCS converters) is described in Vinciarelli, "Power Booster Switching at Zero Current," U.S. Pat. No. 4,648,020, and in Vinciarelli, "Boost Switching Power Conversion," U.S. Pat. No. 5,321, 348, both incorporated by reference. Paralleling of PWM converters in power sharing arrays is described in Unitrode Application Note U-129, "UC3907 Load Share IC Simplifies Parallel Power Supply Design," in the "Unitrode Product & Applications Handbook 1993–94."

SUMMARY

The invention achieves greater efficiency in an AC-DC boost switching power converter for delivering power from an input voltage source of either polarity to a load at a unipolar load voltage. In the invention, an input inductive element receives an input current, Iin, of either polarity, from the input source. A bipolar switch, capable of (a) blocking a voltage of either polarity when off, (b) conducting a current of either polarity when on, and (c) being turned off while carrying current, the bipolar switch, provides a shunt path for returning a shunt current of either polarity, Is, to the input source. Conduction paths are provided for delivering a unipolar output current, Io, to the load. A controller turns the bipolar switch on and off during each of a series of converter operating cycles.

Implementations of the invention may include the following features. Circuit elements may be connected to enable turning the bipolar switch on at zero current and for causing current in the bipolar switch subsequently to return to zero. The circuit elements may include a second inductive element, of value L, and a capacitor, of value C, the circuit elements defining a characteristic time constant, $T=\pi*\text{sqrt}(L*C)$, for variations in the current which flows in the bipolar switch during each of the operating cycles. The controller may turn the bipolar switch on and off at times of essentially zero current, and may control the fraction of each operating cycle during which the bipolar switch is turned on. The input inductive element and the bipolar switch may be part of a bipolar boost cell having a pair of input terminals for connection to the input voltage source and a pair of output terminals for delivering current to the load via the conduction paths. The bipolar boost cell may operate in a PWM, ZCS, or a ZVS mode.

The bipolar boost cell may include a series circuit including a first inductance in series with the bipolar switch, the series circuit being connected between the pair of input terminals, the ends of the bipolar switch being connected to the pair of output terminals. Or the bipolar boost cell may include a first series circuit having a first inductance in series with the bipolar switch, the first series circuit being connected between the pair of input terminals, and a second series circuit having a second inductance and a capacitor, the second series circuit being connected across the bipolar switch, the ends of the capacitor being connected to the pair of output terminals. Or the bipolar boost cell may include a first series circuit having a first inductance in series with a capacitor, the first series circuit being connected between the pair of input terminals, the ends of the capacitor being connected to the pair of output terminals, and a second series circuit having a second inductance in series with the bipolar switch, the second series circuit being connected across the capacitor.

The first inductance may include inductors respectively connected to different ones of the pair of input terminals. The second inductance may include inductors respectively connected to different ends of the capacitor.

In the case of a ZCS bipolar boost cell, the value, L, of the second inductance, and the value, C, of the capacitor may define a characteristic time constant, $T=\pi*\text{sqrt}(L*C)$, for variations in the current which flows in the bipolar switch during each the operating cycle.

The conduction paths may be unidirectional conduction devices. The input current, Iin, may not flow in any of the unidirectional conduction devices and the output current, Io, may flow in no more than two of the unidirectional conduction devices. The unidirectional conducting devices may form a full-wave rectifier having inputs for accepting an electrical input of either polarity and outputs for delivering a unipolar output to the load. The input voltage source may include an AC source which delivers a time-varying bipolar voltage.

The boost cell may have (a) an input inductance connected in series with the bipolar switch and the input source, (b) a series circuit connected across the bipolar switch, the series circuit having a second inductance, of value L, in series with a capacitor, of value C, the second inductance and the capacitance defining a characteristic time constant, $T=\pi*\text{sqrt}(L*C)$ for the sinusoidal rise and fall of currents and voltages in the bipolar boost cell during each the operating cycle. And the conduction paths may have first and second unidirectional conducting devices, each having a first end connected to a first end of the load and each being poled to carry current in a direction toward the load, the other end of the first unidirectional device being connected to a first end of the capacitor, the other end of the second unidirectional conducting device being connected to the other end of the capacitor. There may be a third and a fourth unidirectional conducting device, each having a first end connected to the other end of the load and each being poled to carry current in a direction away from the load, the other end of the first unidirectional device being connected to a first end of the capacitor, the other end of the second unidirectional conducting device being connected to the other end of the capacitor, and the controller controls the opening and closing of the bipolar switch to occur at times of zero current during a series of converter operating cycles.

The input inductance may include inductors connected respectively between each end of the switch and each end of the input source. The second inductance may include inductors connected respectively to different ends of the capacitor.

In general, in another aspect, the invention features a topology in which an input circuit has an input inductance connected in series with the input source, there are two boost cells, each cell having a switch, a second inductance, of value L, having a first end connected to a first end of the switch, a capacitor, of value C, connected between the second end of the second inductance and the second end of the switch, and a diode having a first end connected to the second end of the second inductance. The second ends of both of the diodes are connected to one end of the load and the second ends of the switches are connected to the other end of the load. A controller controls the opening and closing of the switches to occur at times of zero current during a series of converter operating cycles. The second inductance and the capacitance define a characteristic time constant, T=pi*sqrt(L*C) for the sinusoidal rise and fall of currents and voltages in each of the bipolar boost cells during each the operating cycle.

Implementations of the invention may include the following features. The input circuit may be connected between the first ends of the second inductances, or between the second ends of the second inductances. The switches may comprise a unipolar switch capable of withstanding a unipolar voltage when turned off, the polarity of the unipolar voltage defining positive and negative poles on the switch, and capable of carrying a unipolar current, when turned on, between the positive and negative poles, and a first unidirectional conducting device connected in parallel with the unipolar switch, the first unidirectional conducting device being poled so that it conducts current in a direction opposite to that of the unipolar switch.

The controller may be arranged to turn the switch off at essentially the first instant in time, following the time that the switch is turned on, that the current in the switch returns to zero. The controller may be arranged to turn the switch off at essentially the second instant in time, following the time that the switch is turned on, that the current in the switch returns to zero. The controller may maintain the unipolar load voltage at a predetermined setpoint value. The controller may control a waveform of the bipolar input current to follow a waveform of the input voltage source. The bipolar switch may include a pair of unipolar switches, each unipolar switch being capable of withstanding a unipolar voltage when turned off, the polarity of the unipolar voltage defining positive and negative poles on each switch, each switch being capable of carrying a unipolar current, when turned on, between the positive and negative poles, the switches being connected in series in polar opposition to each other, and a pair of unidirectional conducting devices, one of each of the devices being connected in parallel with one of each of the unipolar switches, the unidirectional conducting devices being poled to conduct current in a direction opposite to that of the unipolar switch across which it is connected. The unipolar switch may be an insulated gate bipolar transistor.

In general, in another aspect, the invention features the bipolar boost cell itself.

In general, in another aspect, the invention features an array of power conversion modules similar to the power converters recited above, and the array includes means for controlling each of the modules to deliver a predetermined fraction of the total power delivered to the load.

Implementations of the invention may include the following features. Each of the modules may include inductive elements within both conductive paths leading to the load. The inductive elements in some of the modules may include portions of the input inductive element.

In general, in another aspect, the invention features an AC-DC boost switching power converter for delivering power from a bipolar input voltage source to a load at a unipolar load voltage. An input inductive element for receives, from the source, a bipolar input current, the average value of the absolute value of which is Iin. A switch provides a shunt path for returning, to the source, a fraction of Iin as a bipolar shunt current, the average value of the absolute value of which is Is. Unidirectional conduction devices deliver to the load a unipolar output current, of average value Io=Iin–Is. A controller turns the switch on and off during each of a series of converter operating cycles, the switch and the unidirectional conduction devices being connected so that the input current, Iin, does not flow in any of the unidirectional conducting devices and the output current, Iout, flows in no more than two of the unidirectional conduction devices.

Other advantages and features will become apparent from the following description and from the claims.

DESCRIPTION

FIGS. 6A through 6E compare semiconductor losses in various boost converter topologies.

Figure 6F:
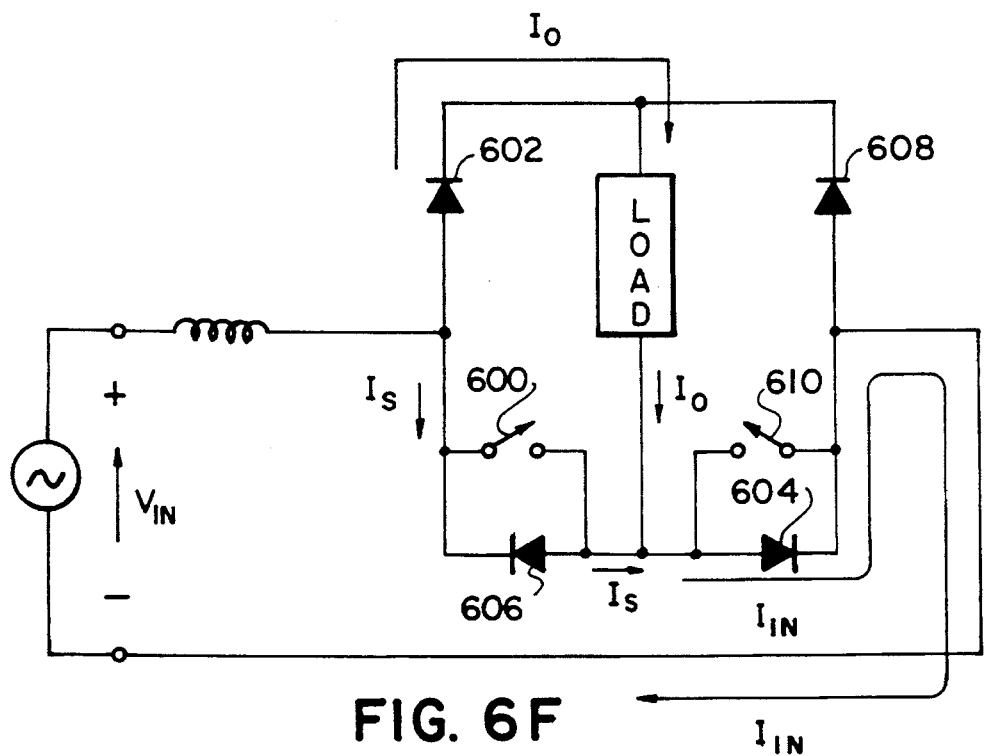

FIG. 6F shows a portion of the converter of FIG. 6E.

Figure 7A:
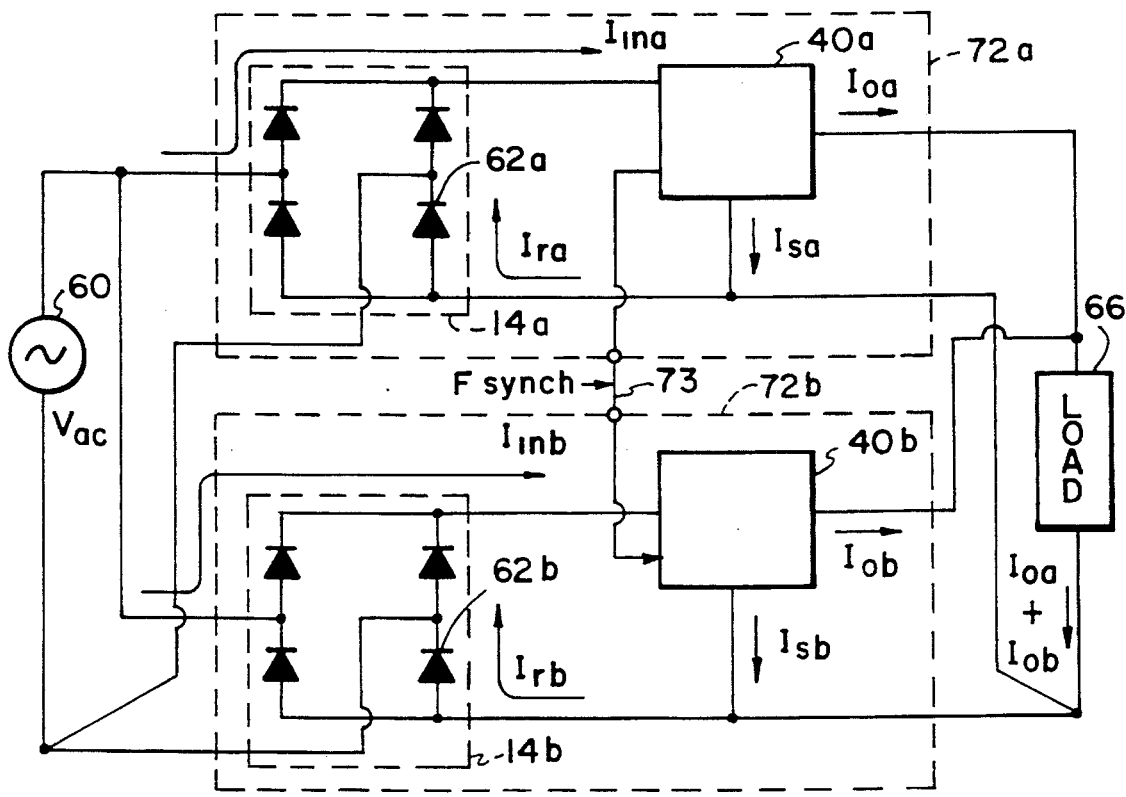

FIG. 7A shows a synchronized array of two AC-DC boost power converters.

Figure 7B:
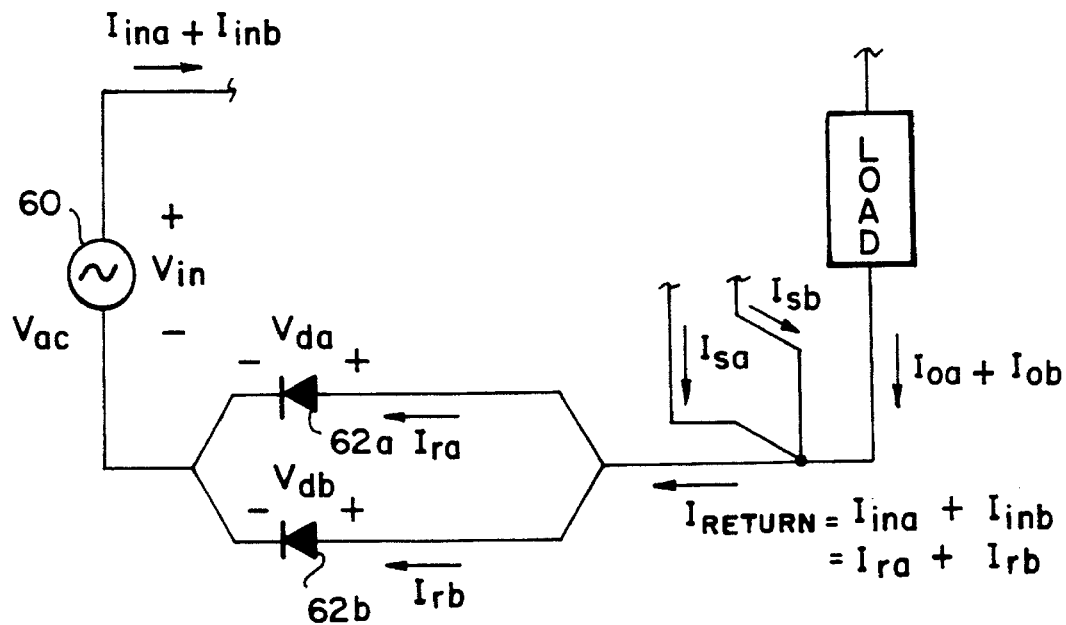

FIG. 7B shows details of return currents which flow in the array of FIG. 7A.

Figure 7C:
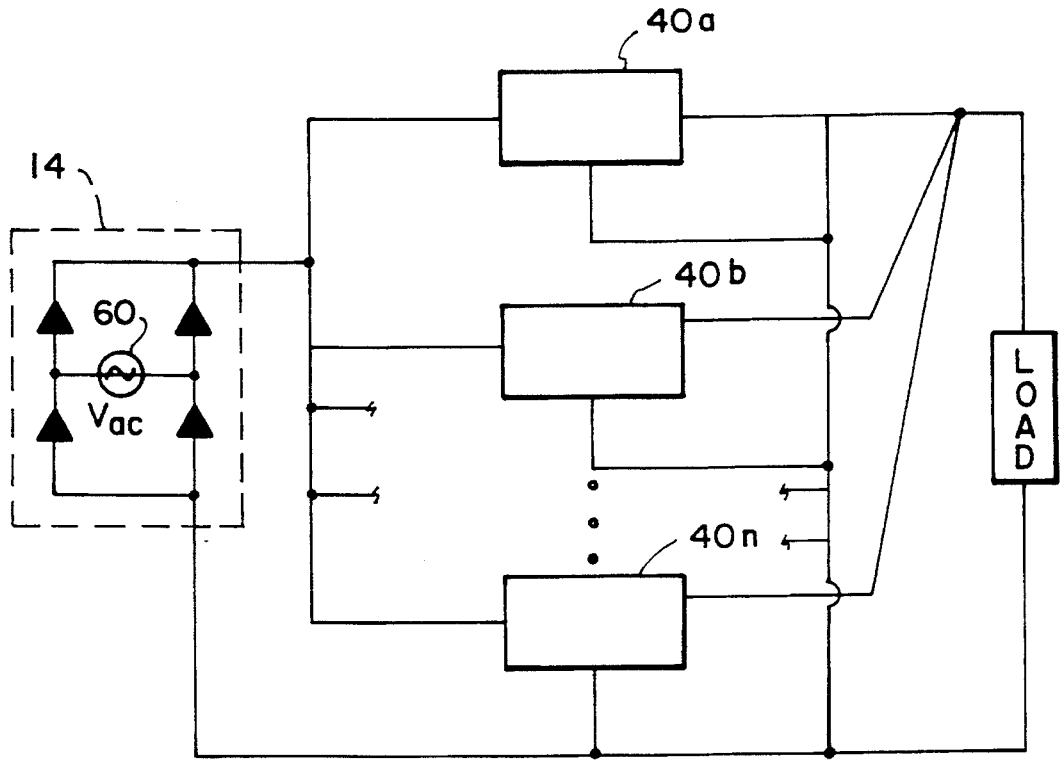

FIG. 7C shows a prior art method of creating power sharing arrays of boost converters.

Figure 8A:
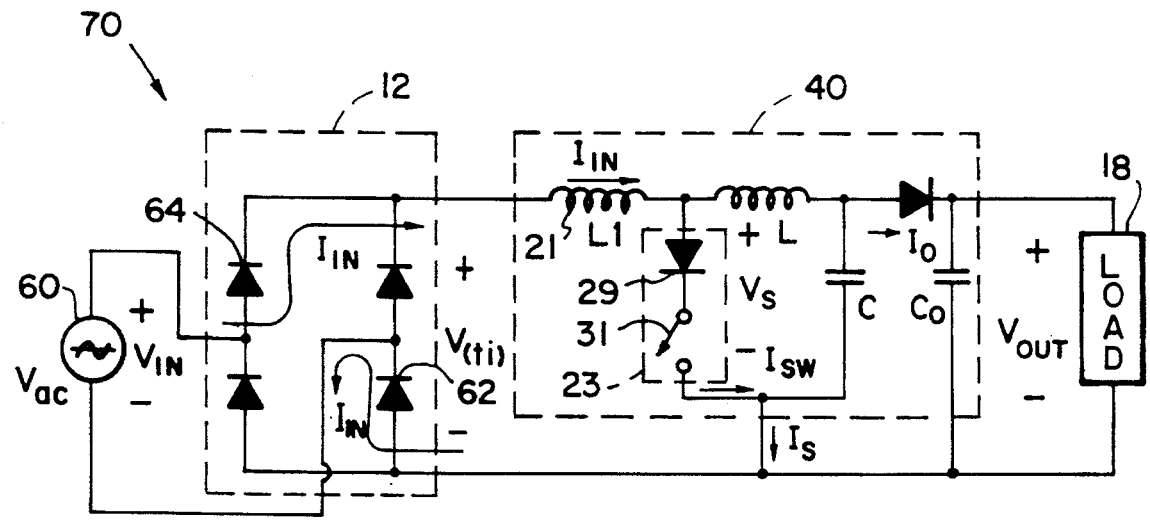
Figure 8B:
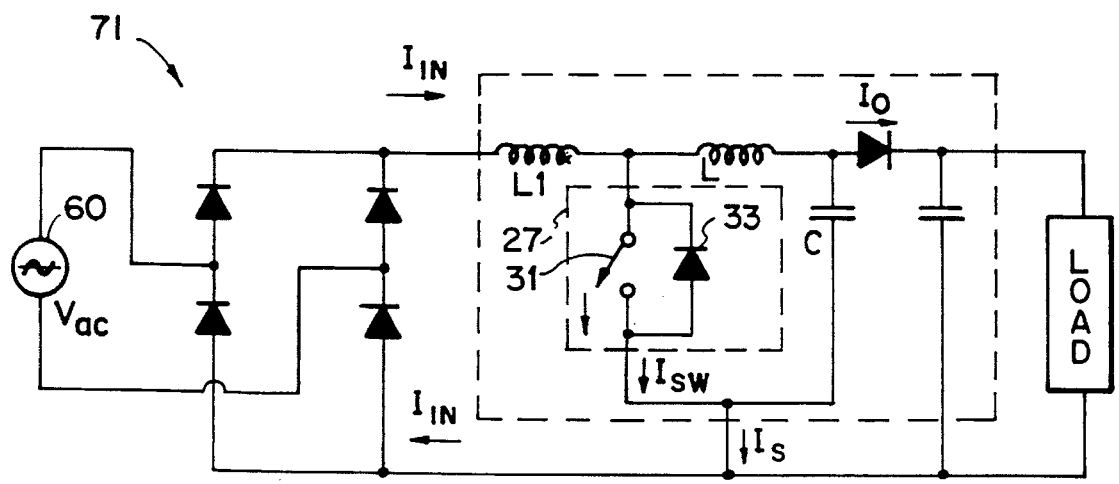

FIGS. 8A and 8B show prior art ZCS AC-DC boost switching power converters.

Figure 9:
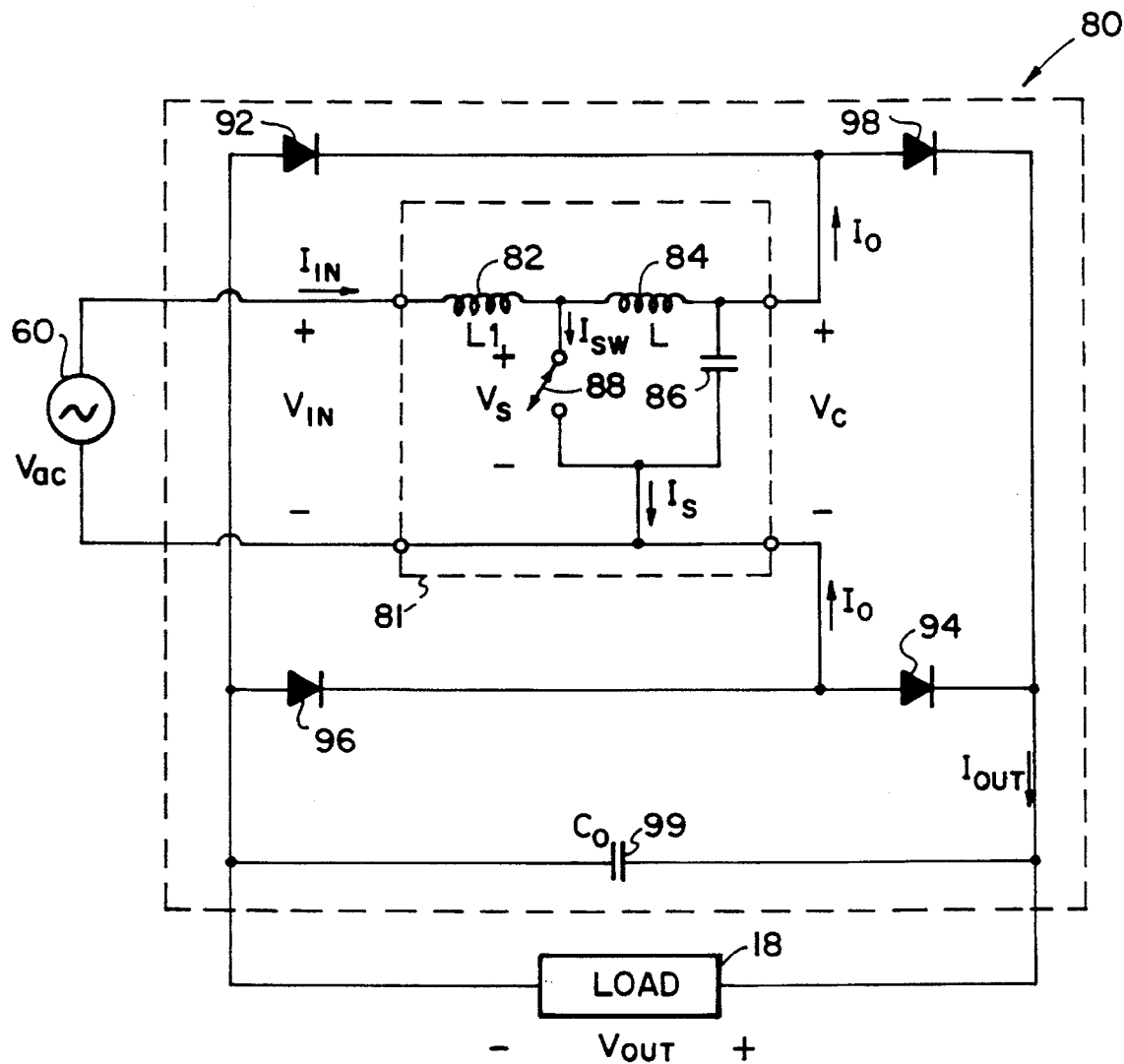

FIG. 9 shows a ZCS AC-DC boost switching power converter according to the present invention.

Figure 10:
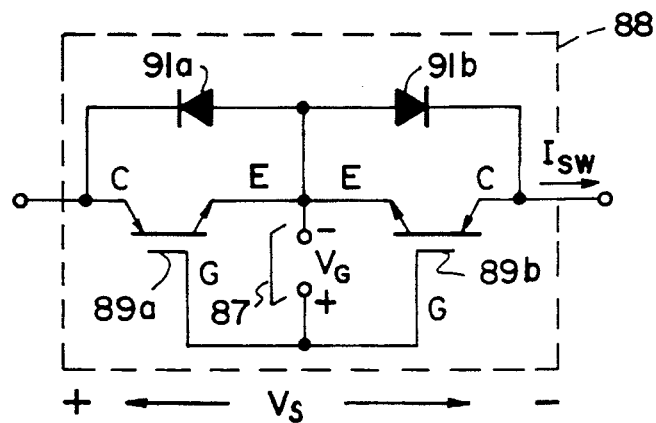

FIG. 10 shows an embodiment of a bipolar switch.

Figure 11:
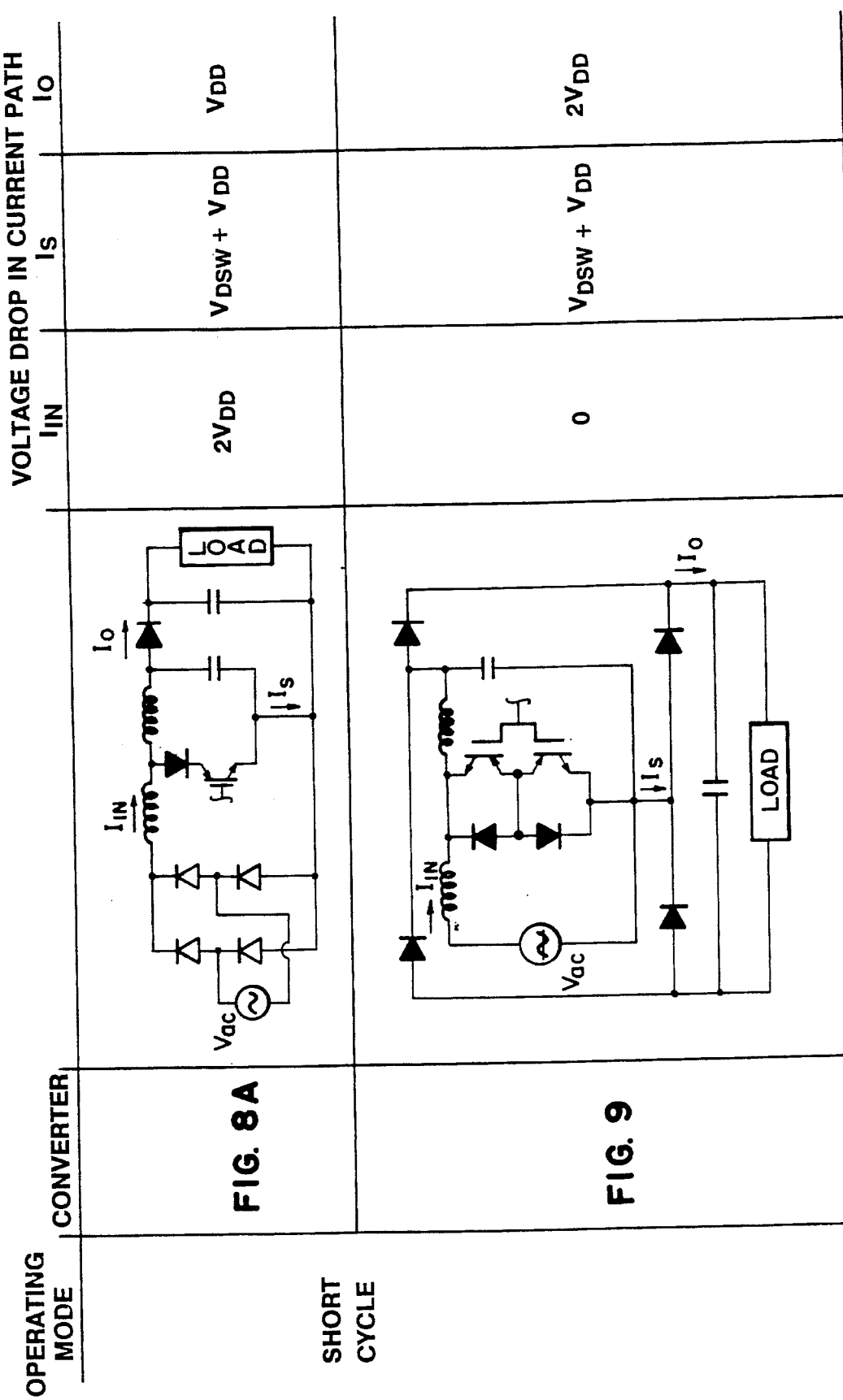

FIG. 11 compares losses in the converters of FIGS. 8A and 9 operating in the short-cycle mode.

Figure 12:
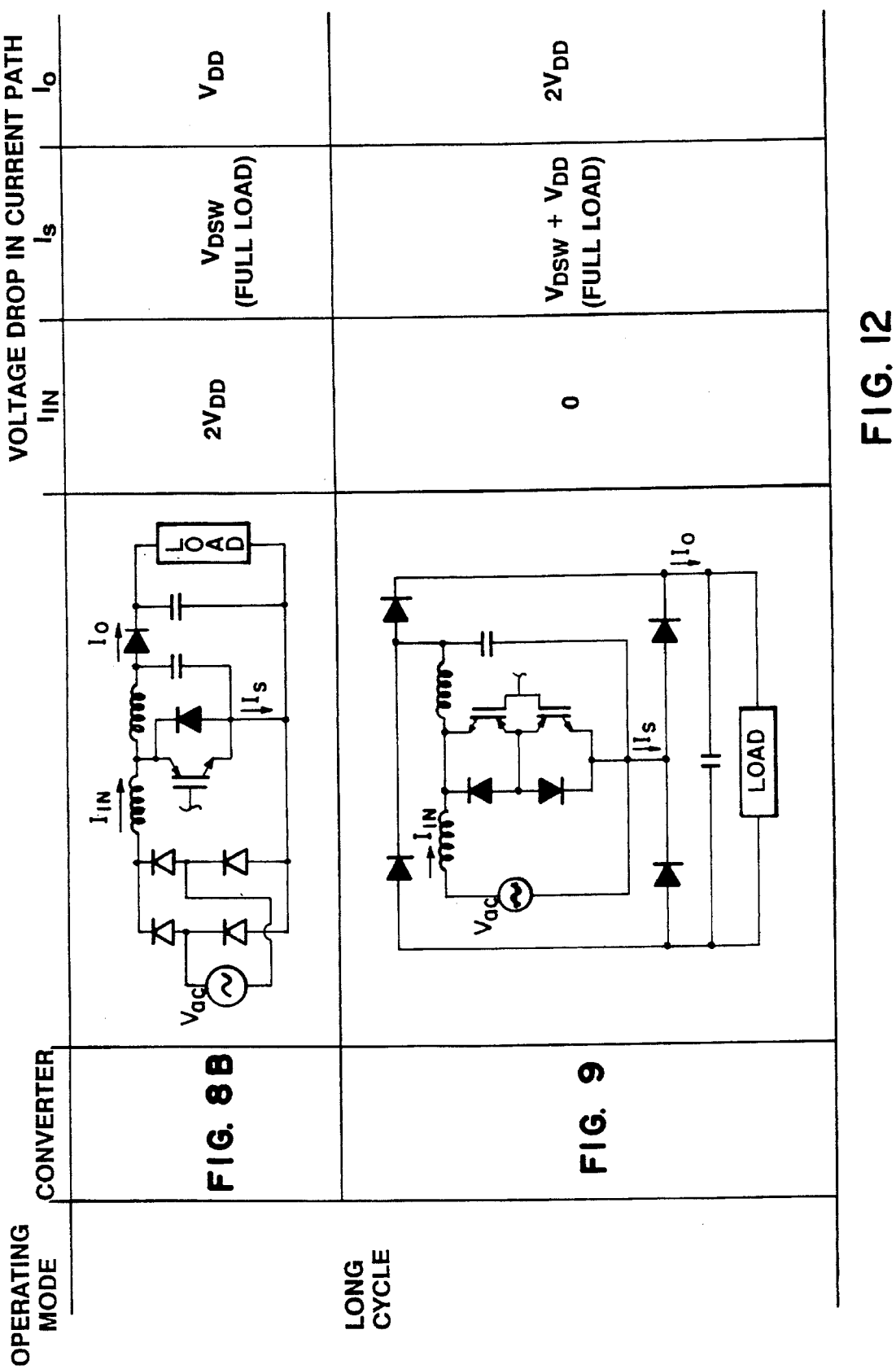

FIG. 12 compares losses in the converters of FIGS. 8B and 9 operating in the long-cycle mode.

Figure 13:
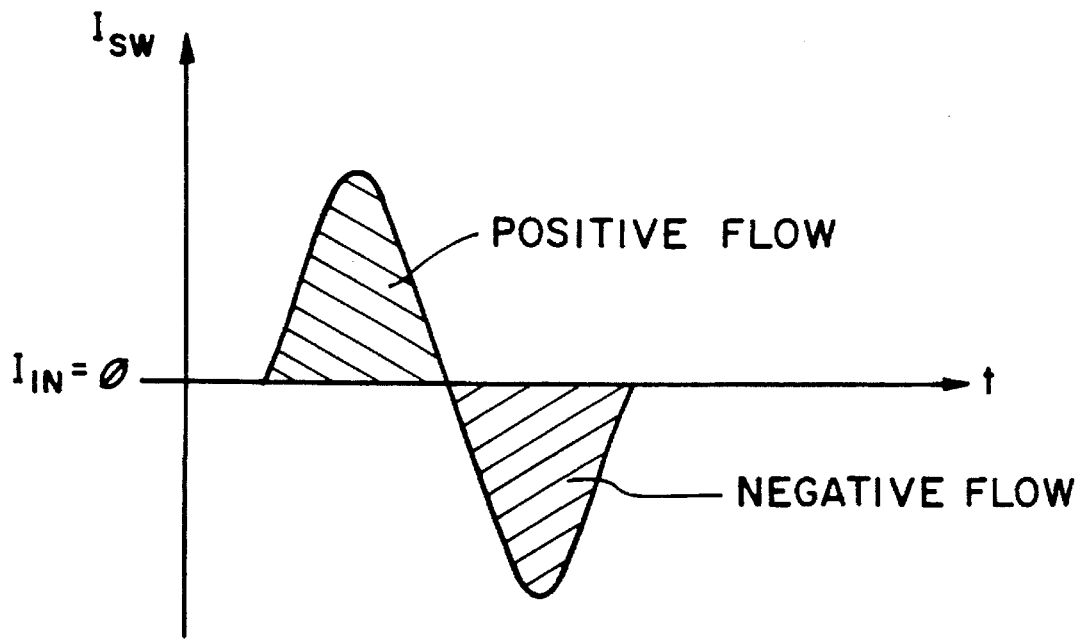
Figure 13:
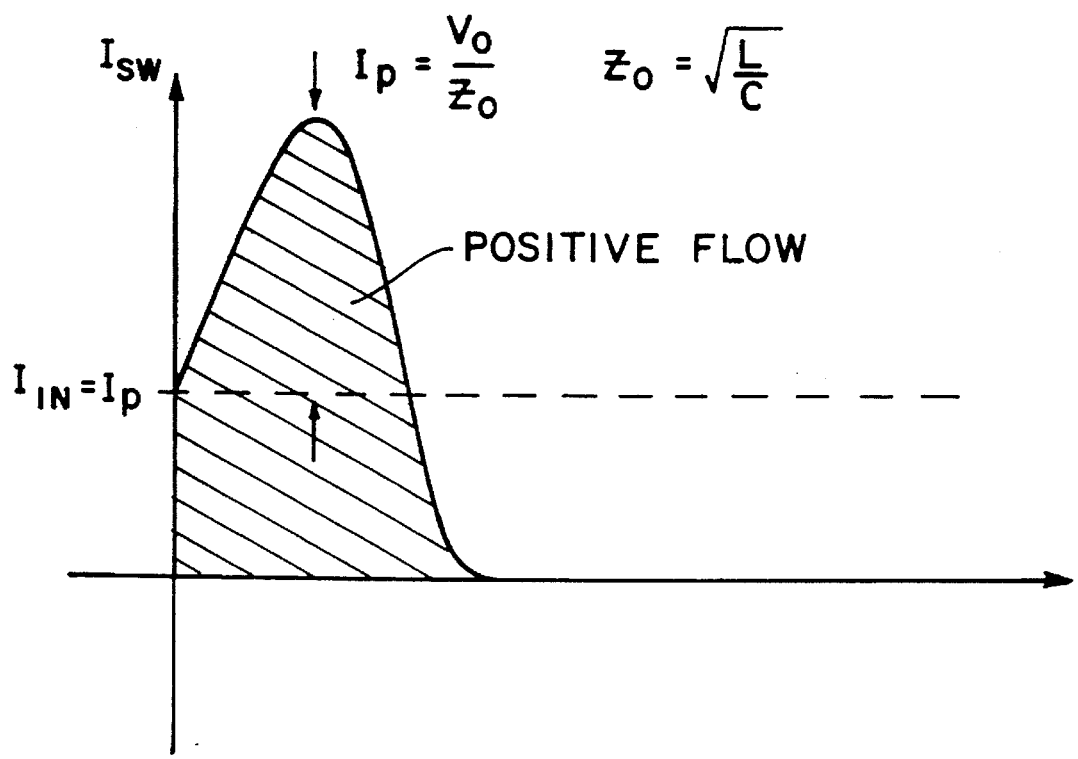

FIG. 13 shows switch currents at different values of load in a ZCS boost switching power converter operating in long-cycle mode.

Figure 14:
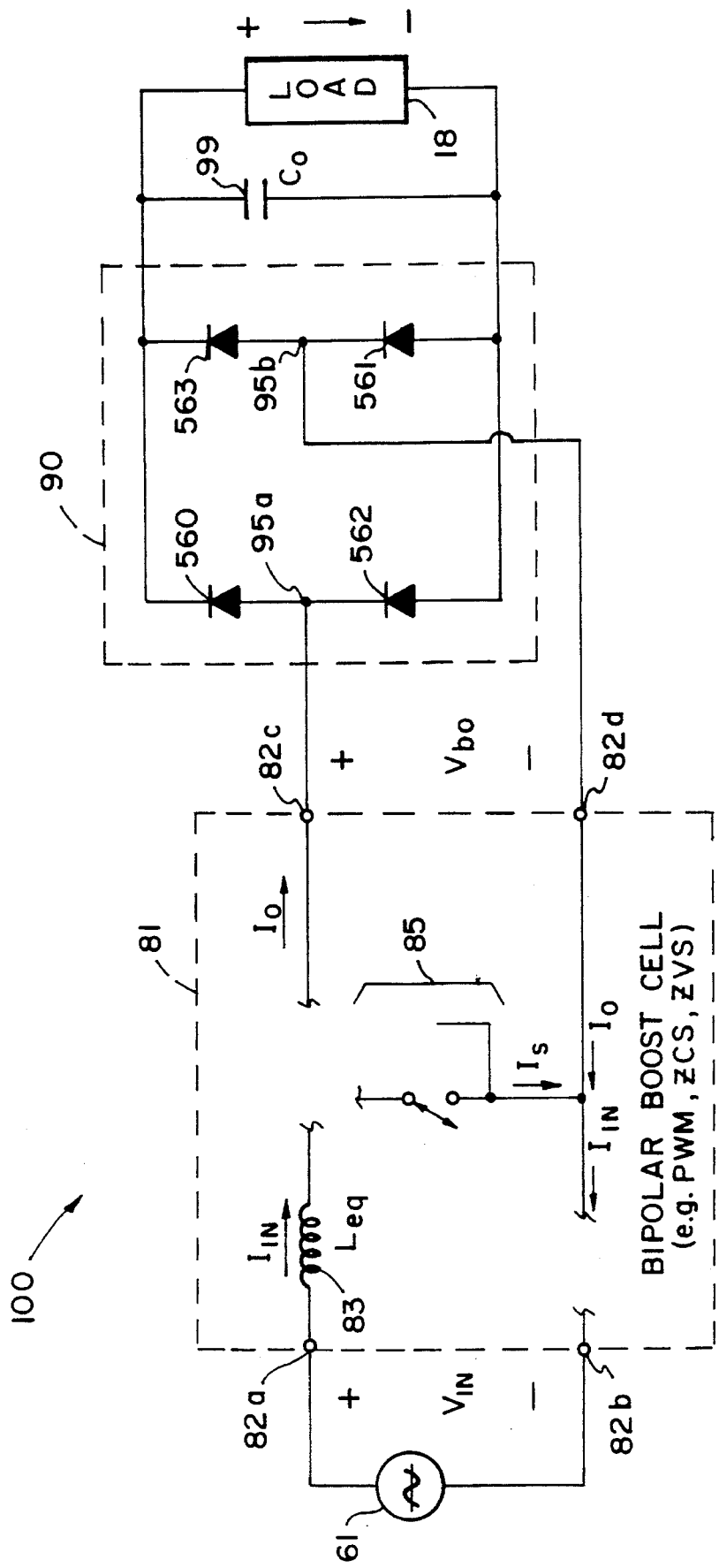
Figure 15:
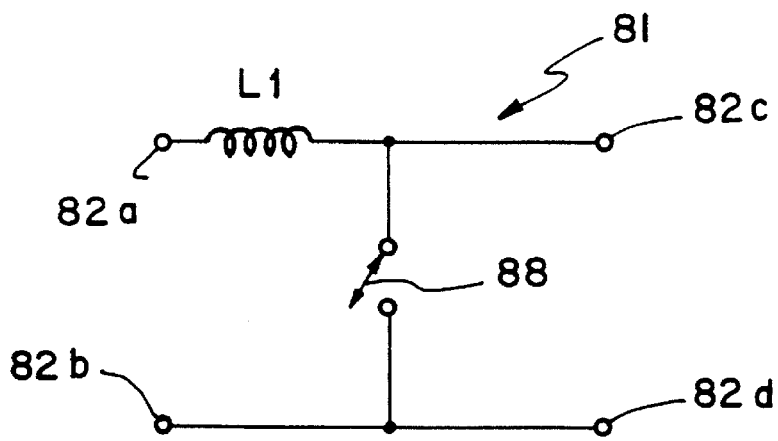
Figure 15:
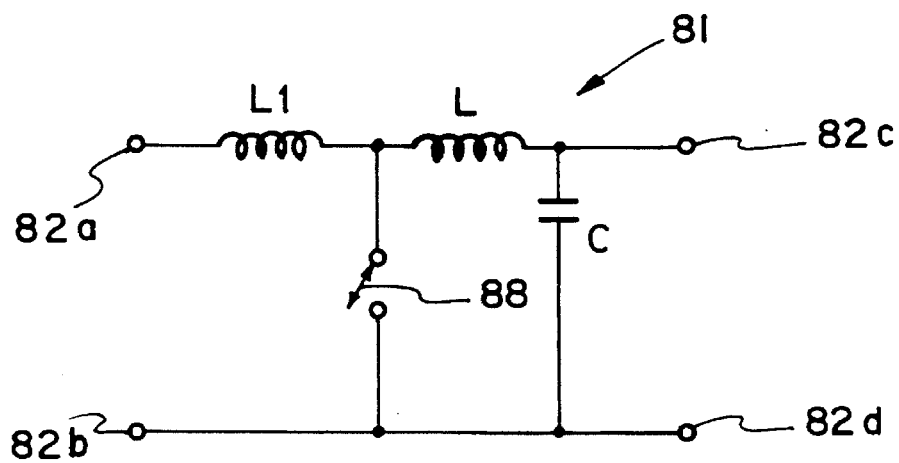
Figure 15:
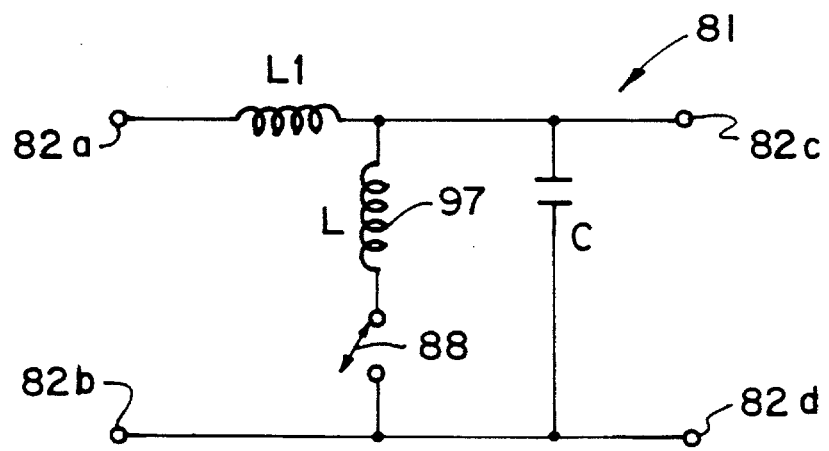
Figure 15:
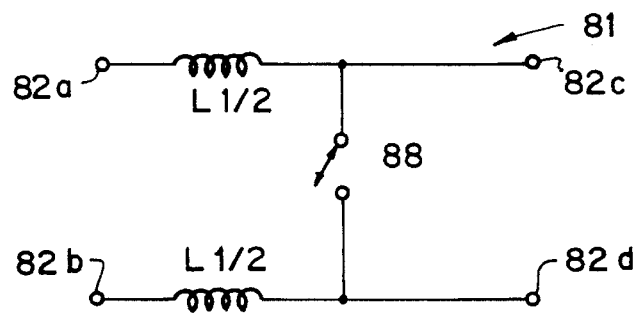
Figure 15:
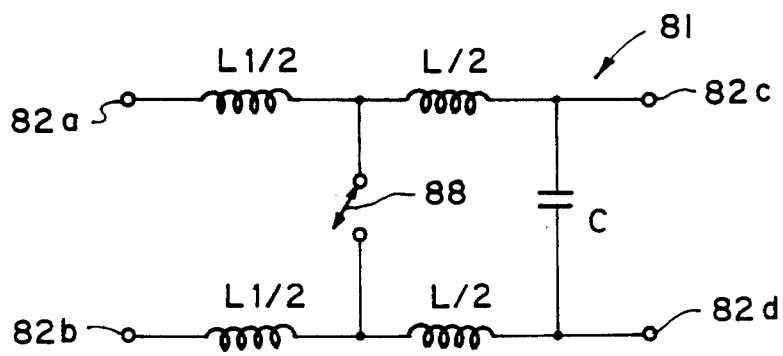
Figure 15:
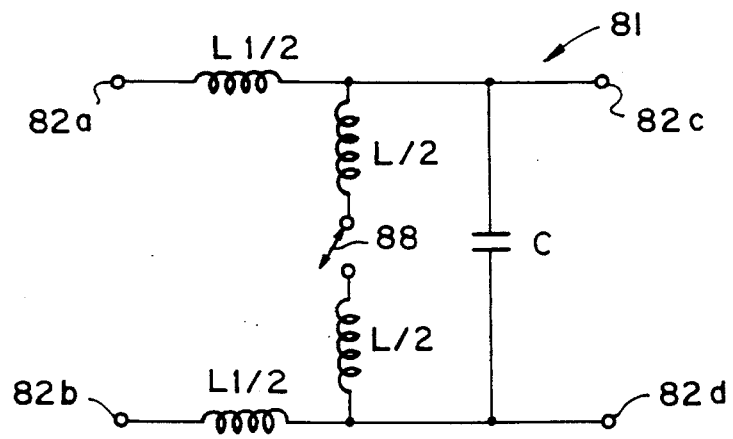
Figure 15:
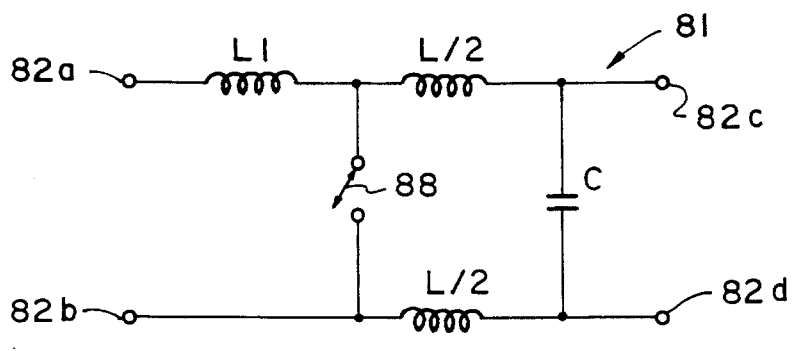

FIG. 14 shows a generalized topology for an AC-DC boost switching power converter according to the present invention.

FIGS. 15A through 15F show alternate bipolar boost cell embodiments for use in the converter of FIG. 14.

Figure 16:
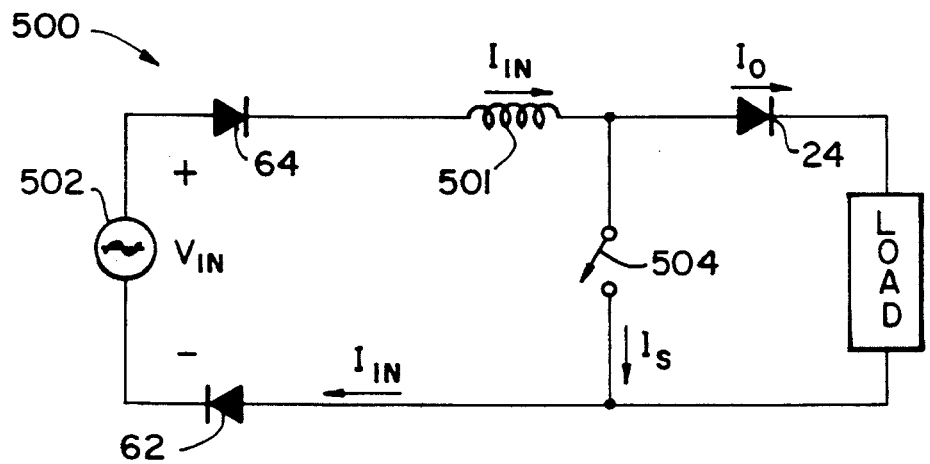
Figure 16:
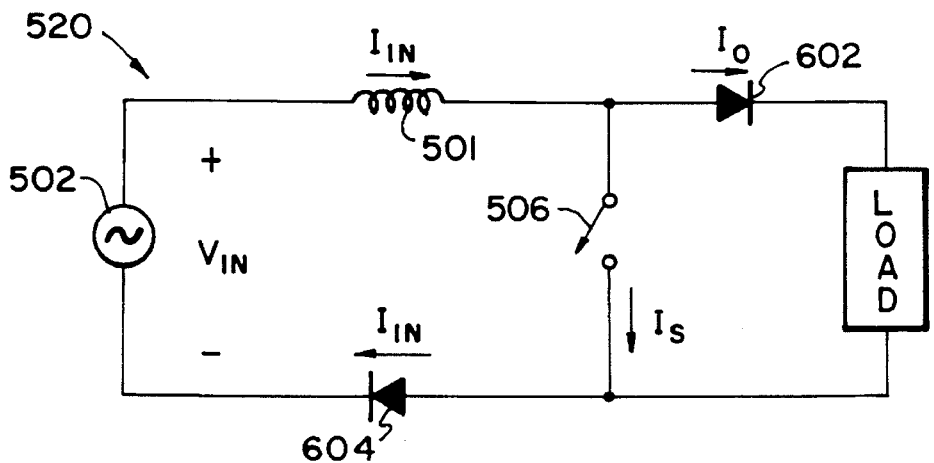
Figure 16:
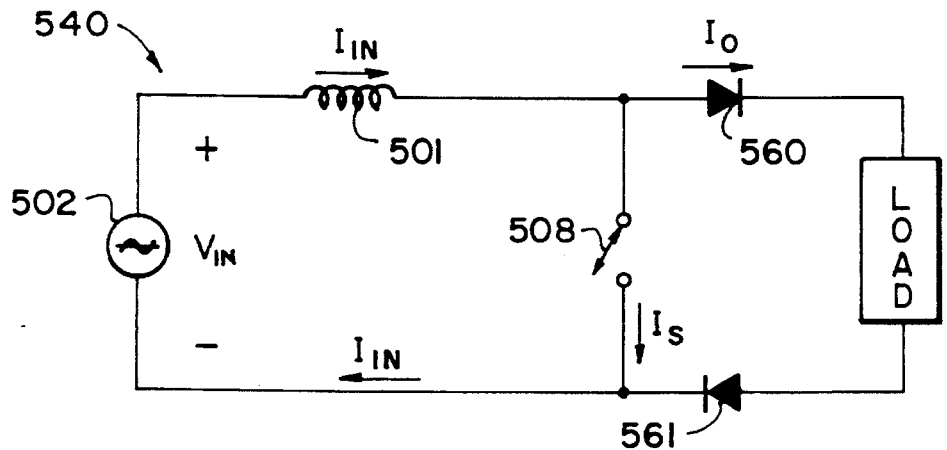

FIGS. 16A through 16C show functional schematics for AC-DC boost converters.

Figure 17A:
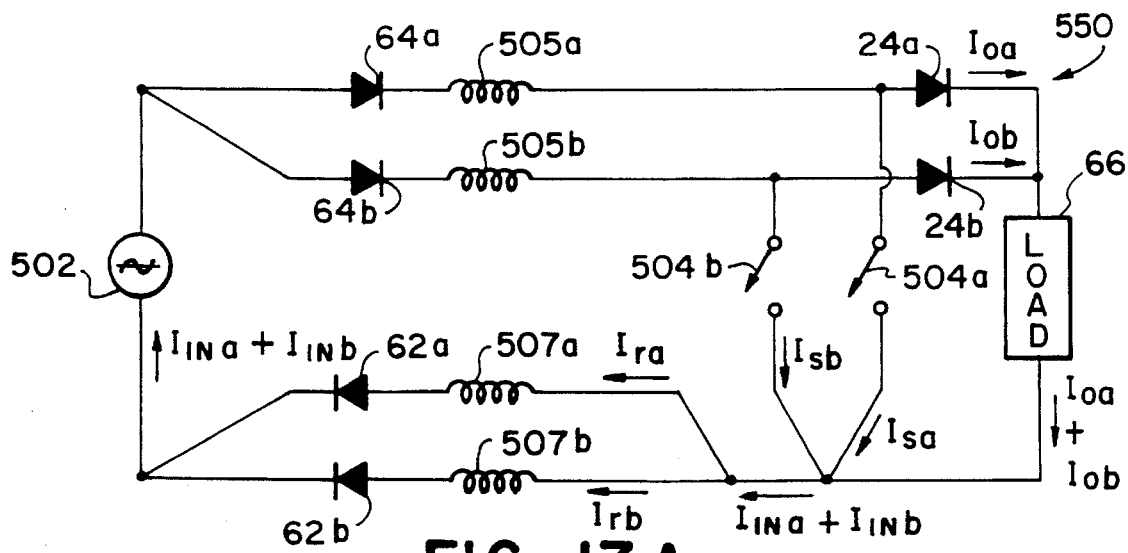
Figure 17B:
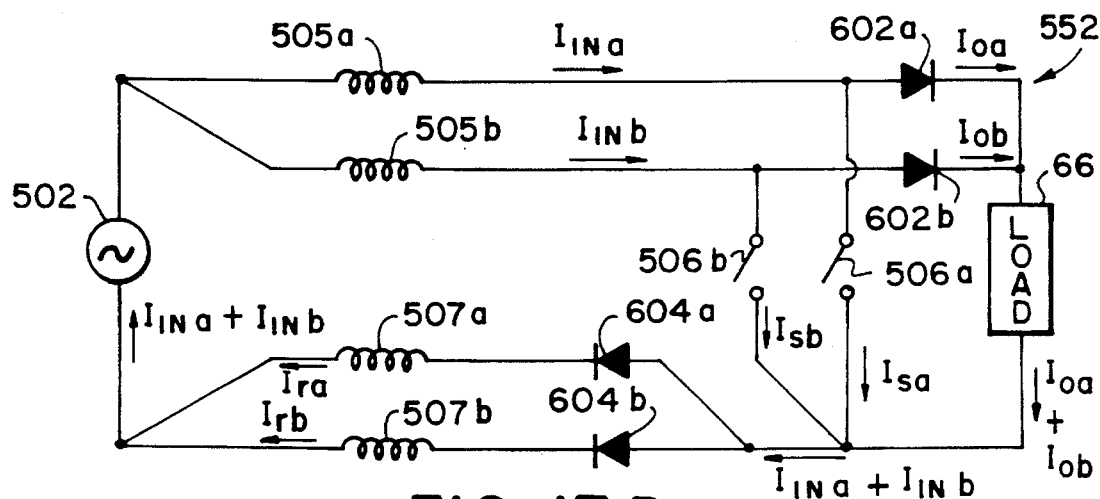
Figure 17C:
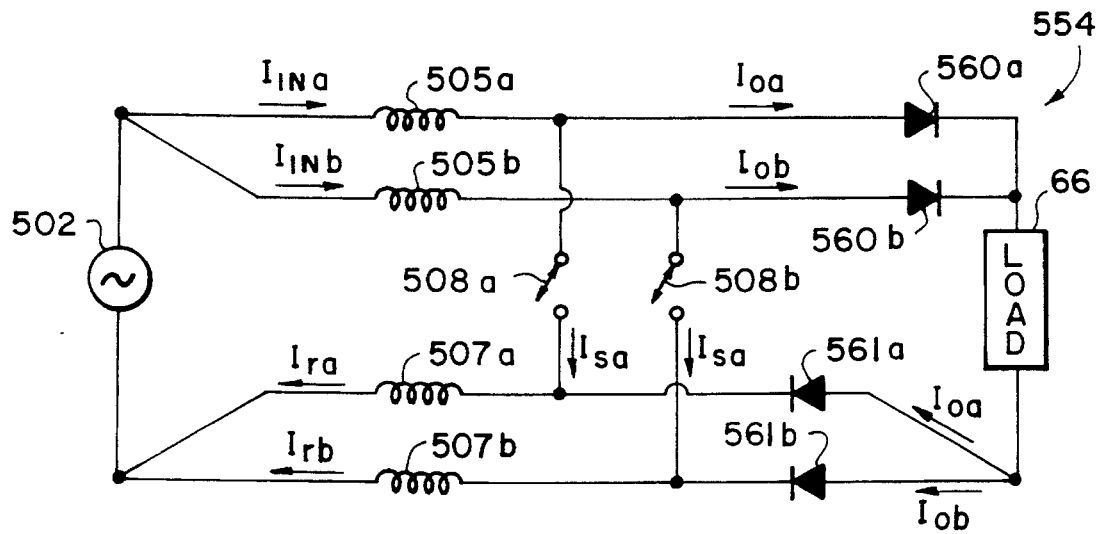

FIGS. 17A through 17C show functional schematics for arrays of AC-DC boost converters.

Figure 18:
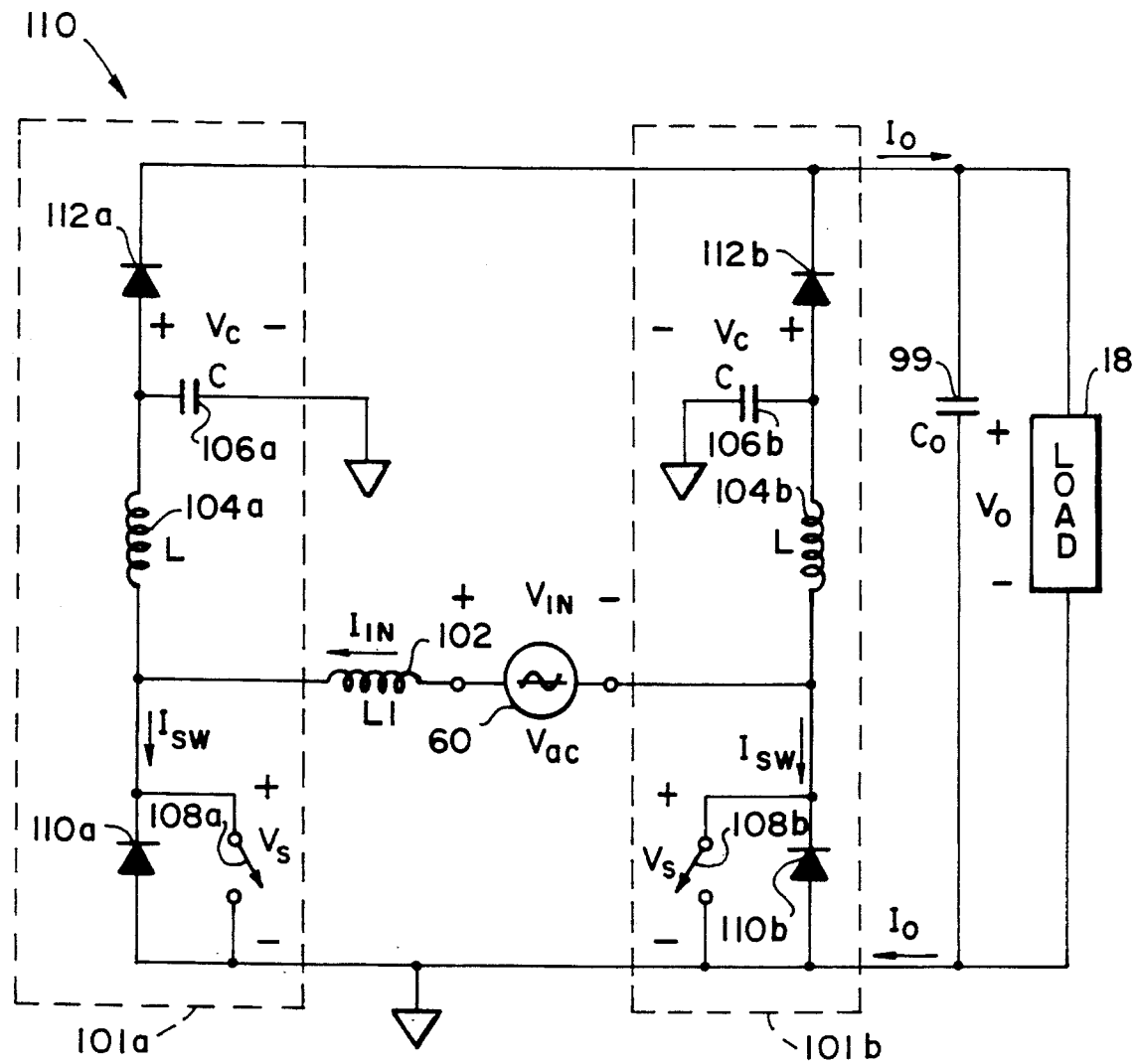

FIG. 18 shows an embodiment of another kind of ZCS AC-DC boost switching power converter in accordance with the present invention.

Figure 19:
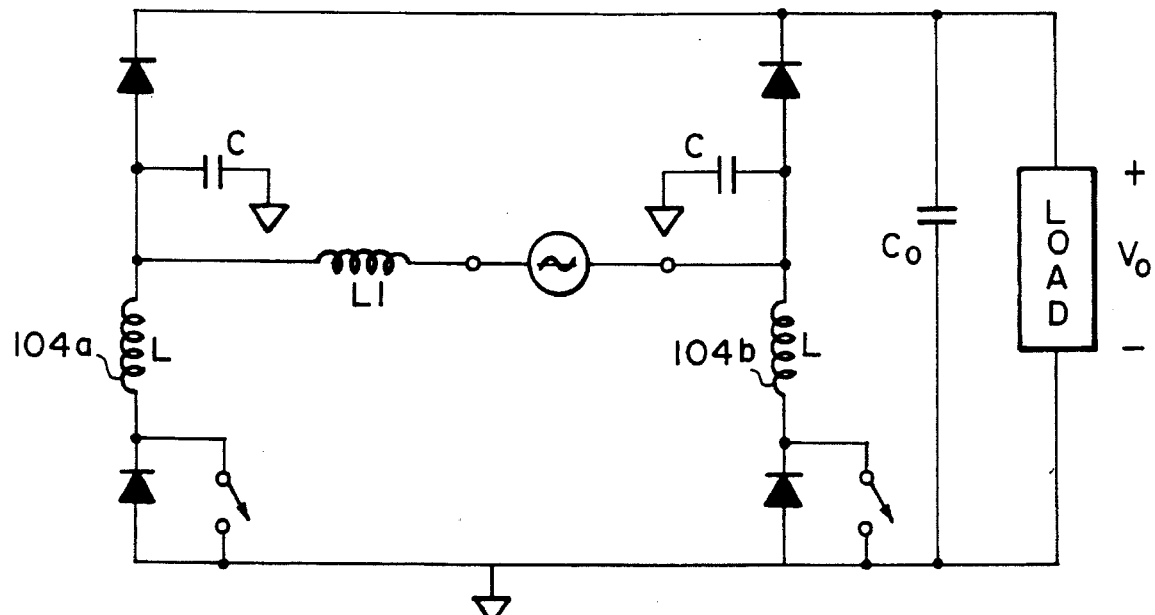

FIG. 19 shows an embodiment of another kind of ZCS AC-DC boost switching power converter in accordance with 25 the present invention.

Figure 20:
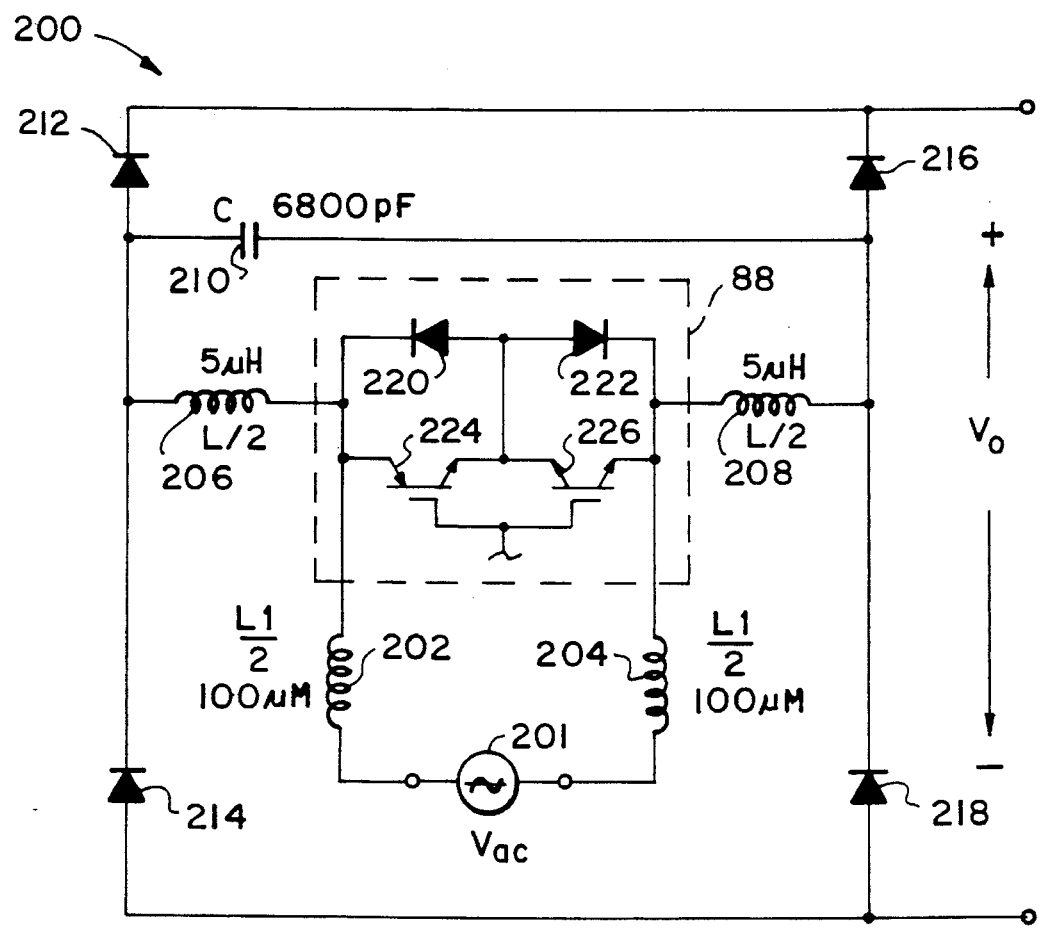

FIG. 20 shows an exemplary embodiment of a ZCS AC-DC boost converter according to the invention.

Figure 21A:
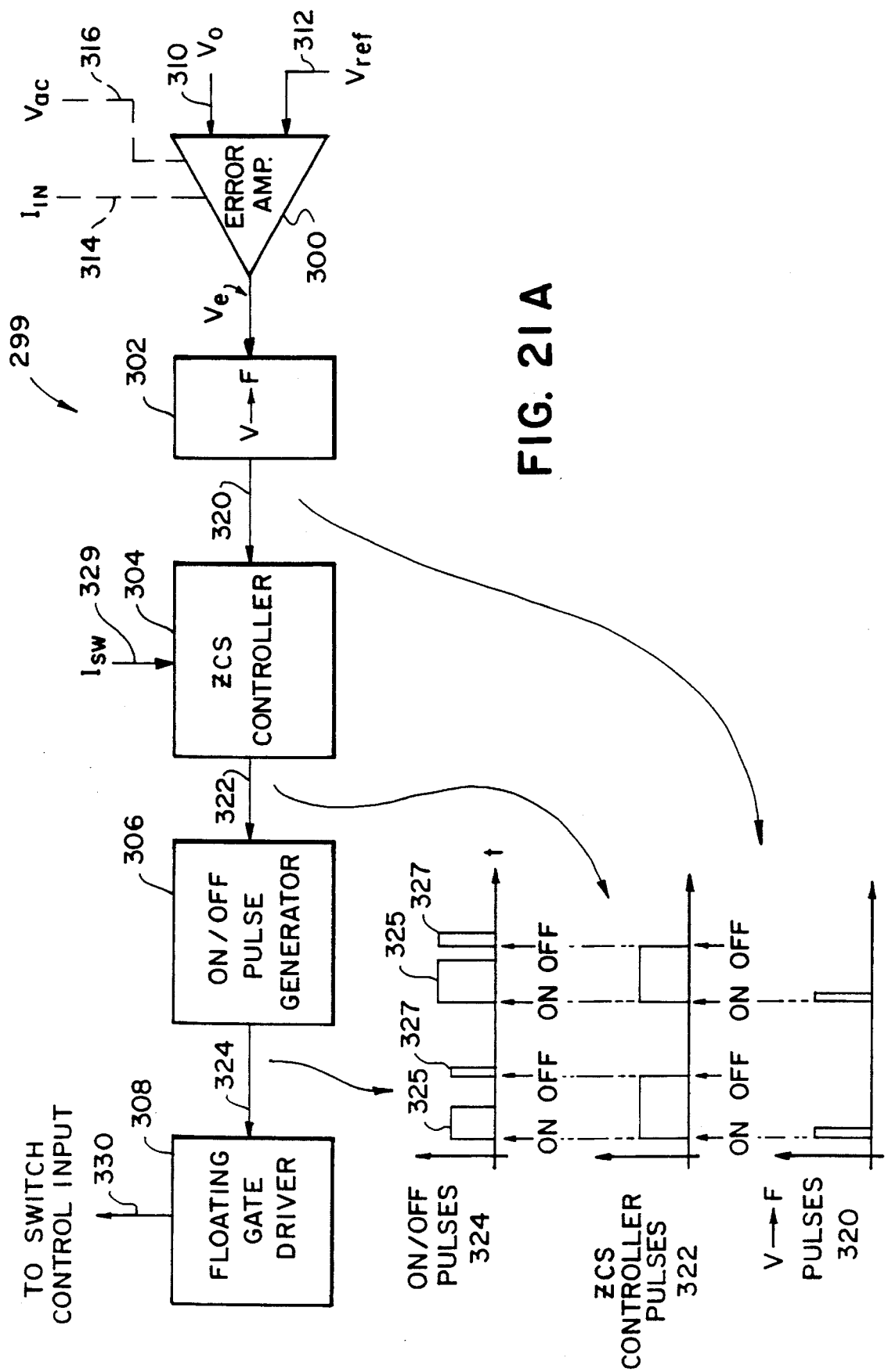
Figure 21:
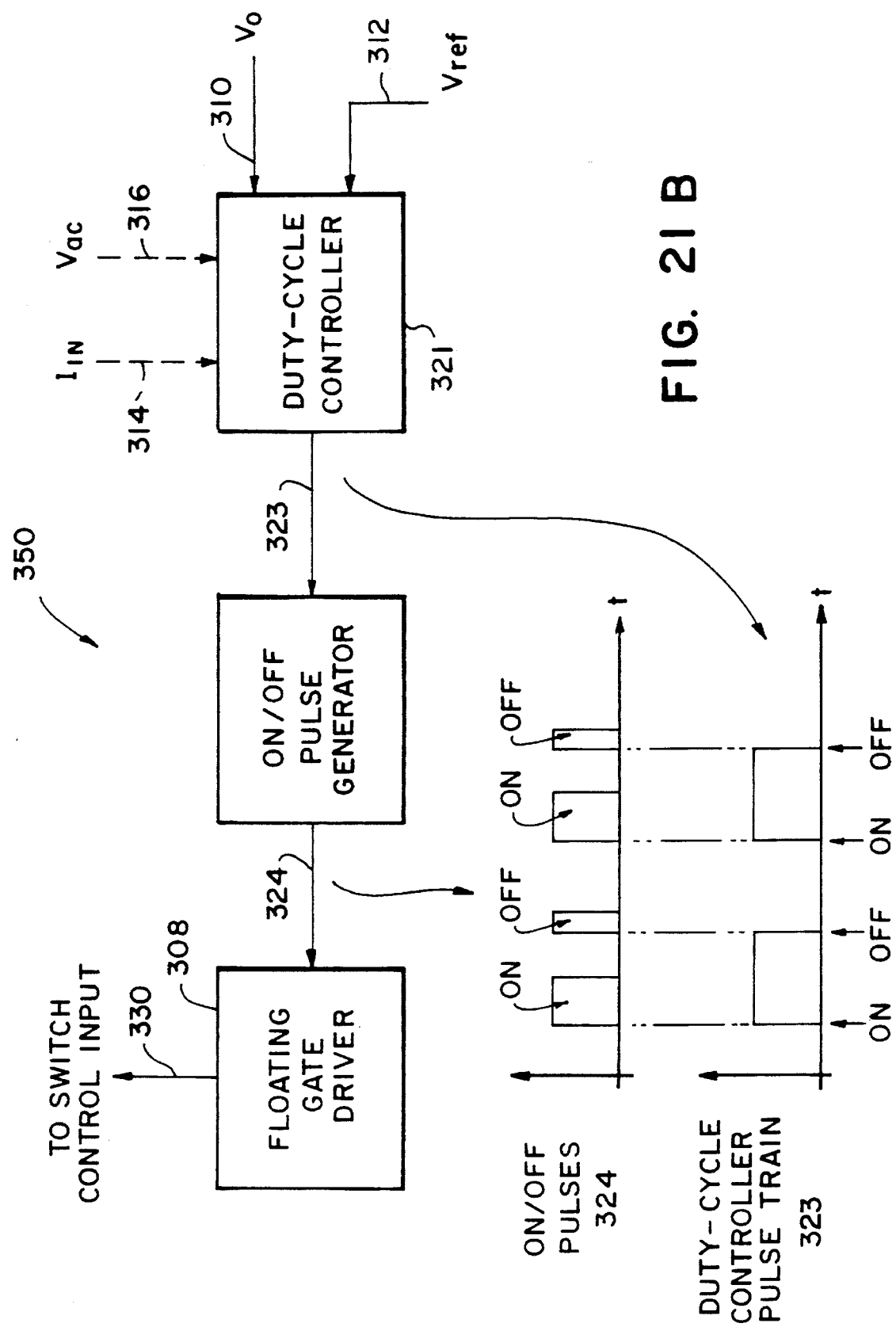

FIGS. 21A and 21B show controllers for use in AC-DC boost converters.

Losses in power converters may be segregated into two broad categories: power which is dissipated in passive elements (e.g., parasitic resistances of inductors and capacitors) and power dissipated in semiconductor elements. In general, losses in passive elements may, at least hypothetically, be reduced to negligible levels by appropriate sizing and cooling of the elements. Losses in semiconductor elements, however, offer much less opportunity for discretionary control—e.g., voltage drops in silicon diodes are fixed by material properties and the laws of physics; factors which decrease losses in switches frequently trade off against larger die sizes, higher cost, slower switching speeds, and increased drive requirements. The best way to reduce losses in semiconductor elements is to avoid them to begin with and this necessitates selecting or developing conversion topologies in which the numbers of semiconductor elements in current-carrying paths are minimized.

In FIGS. 6A through 6E, several shunt boost converter topologies are compared in terms of their respective semiconductor losses. Two types of losses are considered: (1) losses associated with average current flows in the current carrying paths of the converter ("average semiconductor losses") and (2) "dynamic losses" associated with transient changes in currents or voltages (e.g., switching losses when a switch is opened or closed under conditions of finite current flow; reverse recovery losses in a diode). In each Figure, average semiconductor losses associated with the flow of each principal current (e.g., the input current Iin, the shunt current Is, and the output current Io) are calculated based on the assumptions that a conducting switch has a constant voltage drop, Vdsw, that a conducting diode has a constant voltage drop, Vdd, and that converter input and output voltages are of values Vin and Vo, respectively, with Vin<Vout. Since Is and Io are related to Iin by the ratio Vin/Vo, the total average semiconductor loss in the converter is also shown as a function of Iin and Vin/Vo. In comparing AC input converters, the assumption is made that Vin is slowly varying with respect to the operating frequency of the converter and that the instantaneous voltage output of the AC input source is at a value Vin<Vo. ZCS converters are assumed to be operating in the short-cycle mode. For the converter of FIG. 6E, the flow of currents Iin, Is and Io, are shown for the polarity of Vin indicated in the Figure and with switch 600 being duty-cycle controlled; all other switches are open. The presence of dynamic semiconductor losses—e.g. switching losses or reverse recovery losses—is also noted in the Figures.

Historically, the advent of non-isolated ZCS DC-DC boost converters offered many potential benefits relative to their PWM counterparts. By virtually eliminating dynamic semiconductor losses, total converter losses were reduced and converter operating frequency, and therefore converter power density, could be increased. Furthermore, the quantized nature of the energy transfer mechanism in short-cycle ZCS boost converters offered the potential for combining multiple converters into higher power arrays in which each individual converter naturally shares in the power delivered to the load (see Vinciarelli, "Power Booster Switching at Zero Current," U.S. Pat. No. 4,648,020, and Vinciarelli, "Boost Switching Power Conversion," U.S. Pat. No. 5,321,348, both incorporated by reference). However, in non-isolated ZCS DC-DC boost converters operating in the short-cycle mode, these advantages were obtained with a penalty relative to PWM topologies—the need for a switch which could block a bipolar voltage. Practical implementations of such switches, which involve a blocking diode (or saturable inductor) in series with a unipolar switch, exhibit greater average semiconductor loss than the average semiconductor loss in the single unipolar switch used in a PWM converter. Thus, in FIGS. 6A and 6B, which compare total semiconductor losses in a PWM DC-DC shunt boost converter (FIG. 6A) to those in a ZCS DC-DC shunt boost converter (FIG. 6B), it can be seen that the average semiconductor losses in the ZCS converter are higher than those in the PWM converter, the increase being due to the loss in the blocking device 620 in the shunt path of the ZCS converter.

Figure 1A:
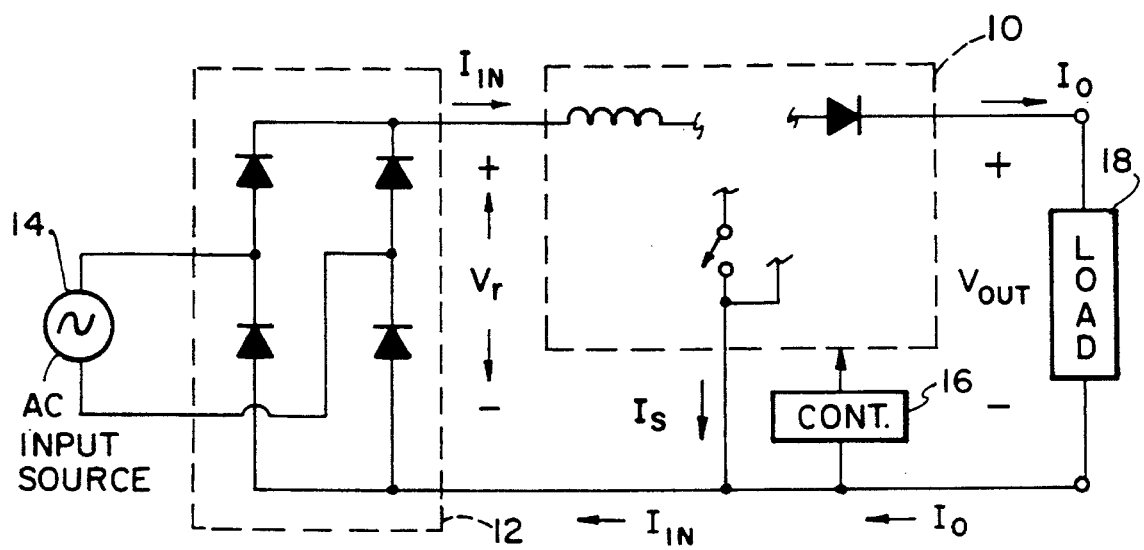
FIG. 1A shows a prior art topology for performing AC-DC boost power conversion.
Figure 1B:
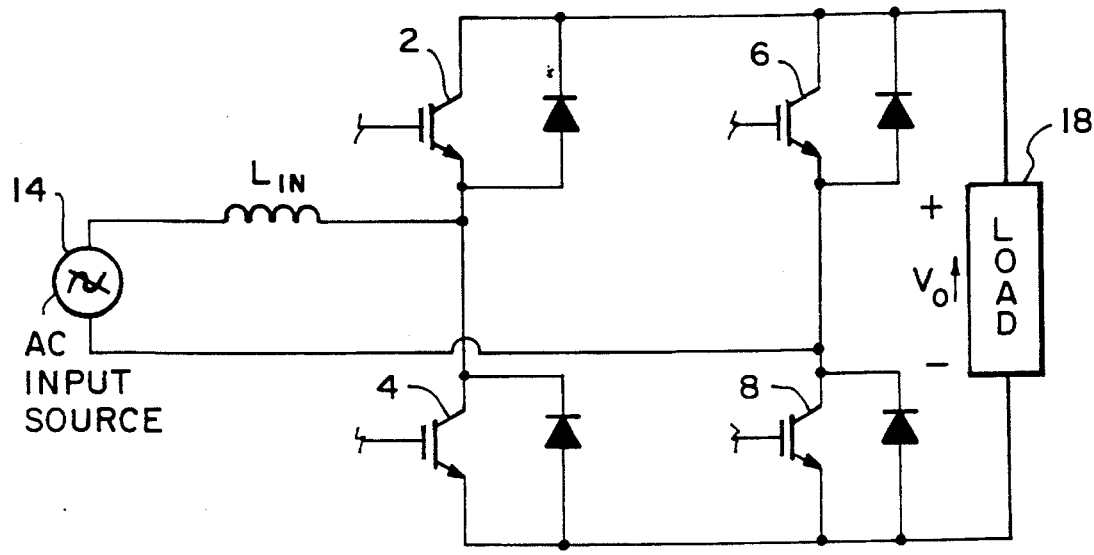
FIG. 1B shows a prior art rectification scheme using bridge-configured switches.
Figure 2A:
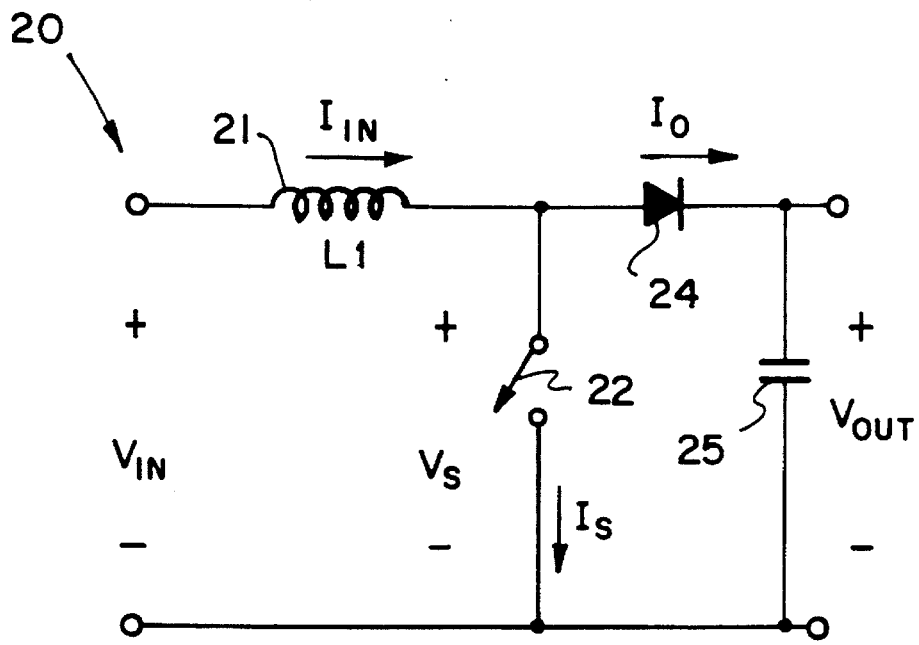
FIGS. 2A through 2D show prior art DC-DC boost switching power converters.
Figure 2B:
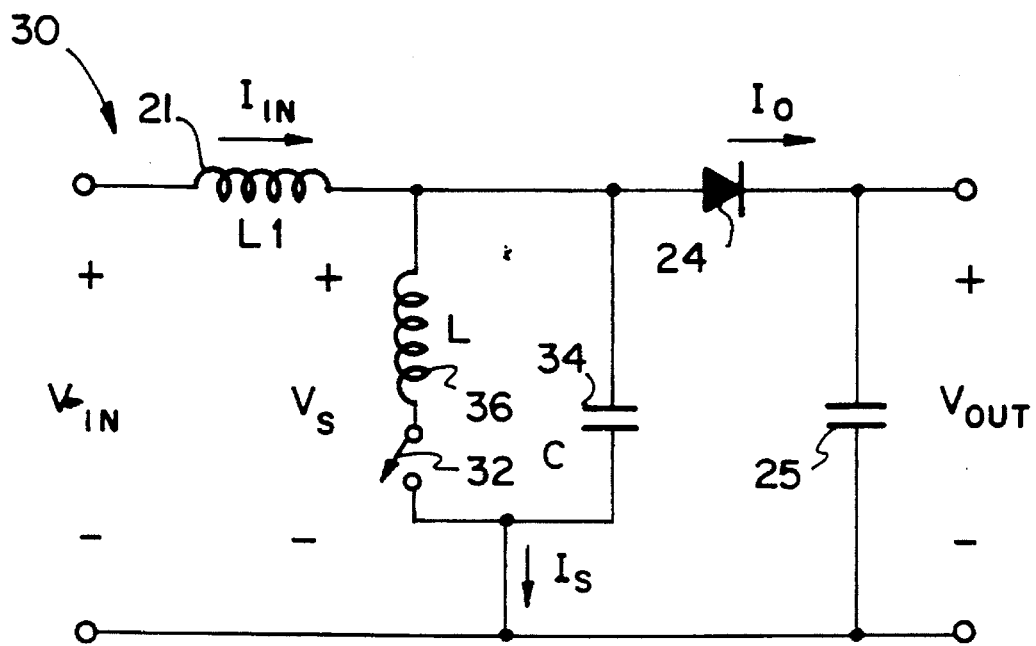
Figure 2C:
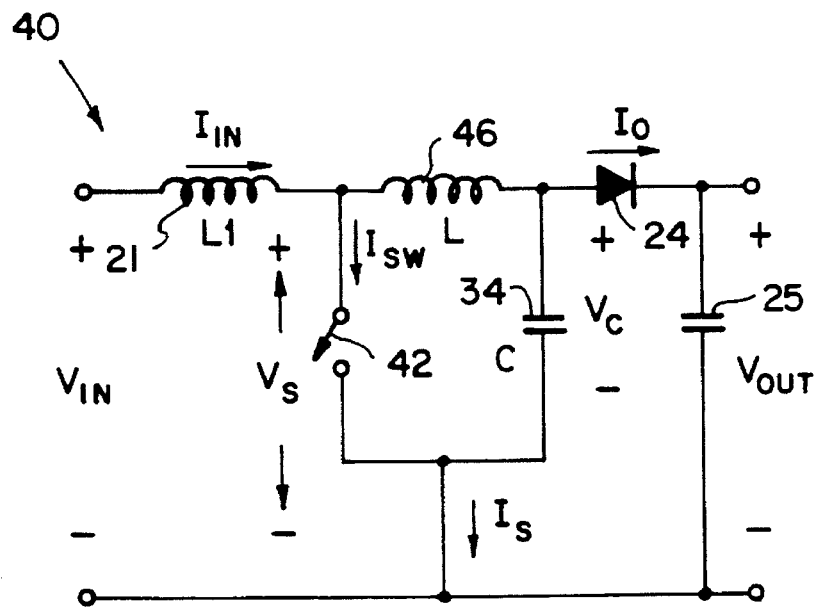
Figure 2D:
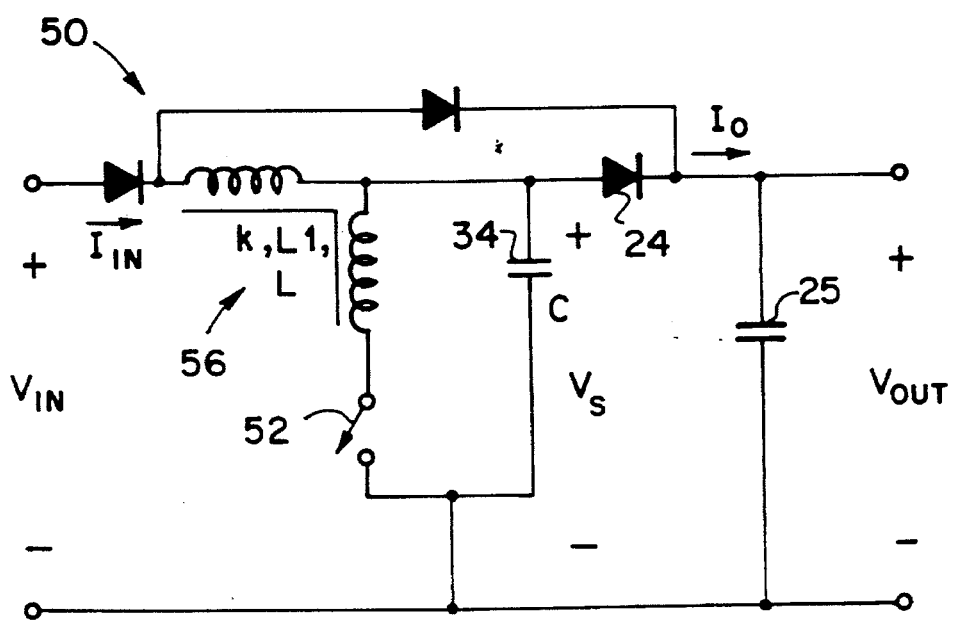

The conventional method of achieving AC-DC boost conversion—adapting a DC-DC shunt boost converter to operate from a bipolar input source by connecting a full-wave rectifier between the source and the input of the boost converter—is an inherently inefficient way of achieving AC-DC conversion. This is true irrespective of the DC-DC boost topology used, since the input current, Iin, which is the largest current which flows in a boost converter, is always flowing in two of the diodes in the full-wave rectifier and the rectifier losses which result from this flow of current are fully incremental to the losses within the converter. This is illustrated in FIG. 8A, which shows the flow of input current in a prior art AC-DC boost converter 70 (of a kind which includes a ZCS shunt boost converter 40 of the kind shown in FIG. 2C, but which could include any kind of shunt boost converter). As Vin declines relative to Vout, the increase in Iin can cause the input rectifier diodes in such converters to become the dominant source of heat loss. Such an arrangement, in which the processes of input source rectification and power conversion are done essentially independently, will be referred to as conversion with "independent rectification and power processing." FIGS. 6C and 6D compare losses in PWM and ZCS AC-DC shunt boost converters, respectively, arranged in this way. In both cases the average semiconductor losses are increased by 2*Vdd*Iin over their DC input counterparts of FIGS. 6A and 6B, and the penalty associated with the ZCS configuration—the additional diode loss in the shunt path containing the bipolar switch—remains unchanged.

Using a full-wave rectifier at the input of a ZCS short-cycle DC-DC boost converter also makes it difficult, or impossible, to exploit the natural power sharing mechanism inherent to such converters as a means of creating power-sharing arrays of arbitrary size. The reason that two or more of such converters cannot easily be used in this way is illustrated with reference to FIGS. 7A and 7B. In FIG. 7A two of the AC-DC converters 72a, 72b of FIG. 6D are shown connected to the same AC source 60 and load 66. A signal, fsynch 73, synchronizes the operating frequency of shunt converter 40b to the frequency of shunt converter 40a. Assuming that the component values within each converter are nominally the same, frequency synchronization will result in both of the output currents, Ioa and Iob, and both of the shunt currents, Isa and Isb, of each respective converter to be essentially the same. The converters 40a and 40b will therefore share essentially equally in the power delivered to the load 66. However, no natural power sharing mechanism exists for ensuring equal sharing of the return currents, Ira and Irb. This is illustrated in FIG. 7B, which shows the shunt and output currents mixing in the current return paths and flowing back to the AC source via rectifier diodes 62a, 62b (assuming that the instantaneous value of voltage delivered by the input source, Vin, is positive). The total return current, Ireturn=Iin1+Iin2=Ira+Irb, would split equally between the two diodes only if the voltage-current characteristics of the two diodes 62a, 62b were precisely the same. Unfortunately, in practice, the relative values of Id1 and Id2 will actually depend on small differences between the voltage-current characteristics of the different diodes 62a, 62b and will stabilize at values such that the voltage drops in the diodes (including voltage drops in any other parasitic resistances in the return paths) are equal. In extreme cases, one of the diodes might carry the majority of the current, with the other carrying very little. If only two or three converters 72 are to be used in an array it is possible to utilize rectifiers 14 having current carrying ratings which can handle the total return current from all of the converters. However, this is impractical in the general case of arbitrarily large arrays. In such cases, it is generally necessary to use a single large rectifier 14 to power a multitude of DC-DC shunt converters 40a, 40b . . . 40n, as shown in FIG. 7C. It is also to be noted that attempting to force current sharing by, for example, restructuring the converter with the input inductor (21, FIG. 6D) in the return leg of the converter will be fruitless. Since the inductor is sized to smooth the flow of current Iin resulting from variations in Vs which occur at converter operating frequencies which are typically orders of magnitude higher than the frequency of the bipolar source 60, the value of L1 will not ordinarily be anywhere near large enough to substantially affect the sharing of the "low frequency" currents Ira, Irb, which flow in the diodes 62a, 62b.

An improvement in PWM AC-DC shunt boost conversion efficiency can be achieved by use of PWM switched bridge arrangements (FIG. 6E). Such converters reduce AC-DC boost converter average semiconductor losses, relative to losses in AC-DC converters with independent rectification and power processing, by better integrating the power processing and rectification functions. In a full-bridge converter of the kind shown in FIG. 6E, the four switches 600, 601, 610, 611 allow for bidirectional power flow between the source and the load, which is useful for driving certain kinds of loads, such as variable-speed AC motors. To perform AC-DC boost conversion, only two of the switches are needed and this portion of the circuit of FIG. 6E is redrawn in FIG. 6F. At any time during operation of the converter of FIG. 6F, one of the two diodes 602, 608 is carrying a pulsating, high frequency, output current, Io; one of the two diodes 604, 606 is carrying a continuous, "low frequency," input current, Iin; and one of the switches 600, 610 is being duty-cycle controlled (the other is off). When the voltage delivered by the bipolar input source, Vin, is positive as indicated in the Figure, diode 604 carries continuous current Iin, switch 600 is being duty-cycle controlled, and diode 602 carries pulsating current Io (having a peak value Iin and a value of zero when switch 600 is on); when the source voltage, Vin, is negative, diode 606 carries continuous current Iin, diode 608 carries pulsating current Io, and switch 610 is being duty-cycle controlled. Thus, at any given time, a single diode is carrying the continuous current Iin and a single diode is carrying the pulsating current, Io, which is in contrast to converters with independent rectification and power processing in which two diodes always carry a continuous current, Iin, and one diode always carries a pulsating Io. By using diodes to perform a combination of (low frequency) rectification and (high frequency) power processing functions, the average semiconductor losses in the converter of FIG. 6F are lower than those in converters with independent rectification and power processing. However, PWM converters of this kind still exhibit dynamic semiconductor losses and will not naturally share in the delivery of power to a load in arrays of multiple converters.

The present invention achieves the benefits of ZCS conversion—e.g., minimization of dynamic losses; high operating frequency; high power density; natural power sharing within arrays of converters—without paying any penalty, relative to prior art converters, regarding average semiconductor losses. This combination of benefits would allow constructing converters, and arrays of converters, which could offer high conversion efficiencies.

One embodiment of an AC-DC boost converter 80 according to the present invention is shown in FIG. 9. In the Figure, the converter includes of a bipolar ZCS boost cell 81; diodes 92, 94, 96, 98; and an output filter capacitor 99. An AC source 60 delivers power to the input of the converter 80; a load 18 is connected across the converter output. Boost cell 81 includes an input inductor 82; a second inductor 84; a capacitor 86 and a bipolar switch 88. The bipolar switch 88 is of the kind which can block a voltage of either polarity when open and carry current in either direction when closed. The bipolar nature of the switch is indicated by the double-headed arrow in the schematic symbol shown in the Figure.

One embodiment of a bipolar switch is shown in FIG. 10. In the Figure the bipolar switch 88 includes two identical Insulated Gate Bipolar Transistors 89a, 89b ("IGBT") connected to conduct in opposite directions and two diodes 91a, 91b also connected to conduct in opposite directions. A switch control voltage, Vg, applied to the switch control input 87 (e.g., applied simultaneously between the G-E terminals of both IGBTs) is used to simultaneously enable and disable conduction of both devices. If the voltage Vs is positive and the IGBTs are enabled, current will flow in the series circuit consisting of IGBT 89a and diode 91b. If the voltage Vs is negative, and the IGBTs are enabled, current will flow in the series circuit consisting of IGBT 89b and diode 91a. The switch may be disabled, whether or not current is flowing in the switch in either direction, by reducing the switch control voltage (e.g., to zero volts) to below the turn-off thresholds of the IGBTs. If the IGBTs are disabled (e.g., Vg is at zero volts), then no current path exists through the switch 88. It should be noted that the total voltage drop across the switch 88 when it is enabled is the sum of the voltage across a single conducting IGBT and a single conducting diode (e.g. the sum of the drops in IGBT 89a and diode 91b). Thus, the switch in FIG. 10 will exhibit no more total loss during short-cycle operation than the loss exhibited by the switch 23 in the converter 40 of FIG. 8A. It should be apparent that the switch of FIG. 10 could also be embodied using either bipolar transistors or FETs in place of the IGBTs.

Figure 3A:
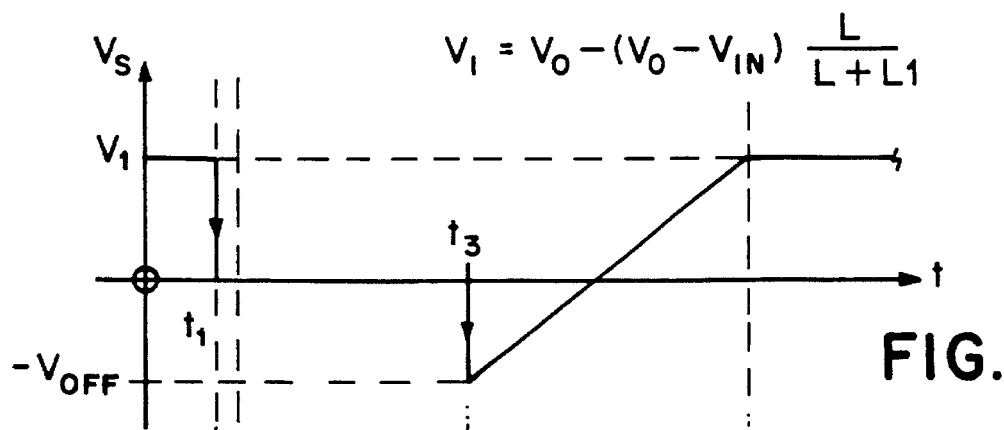
FIGS. 3A through 3D show waveforms for the converter of FIG. 2C operating in the short-cycle mode.
Figure 3B:
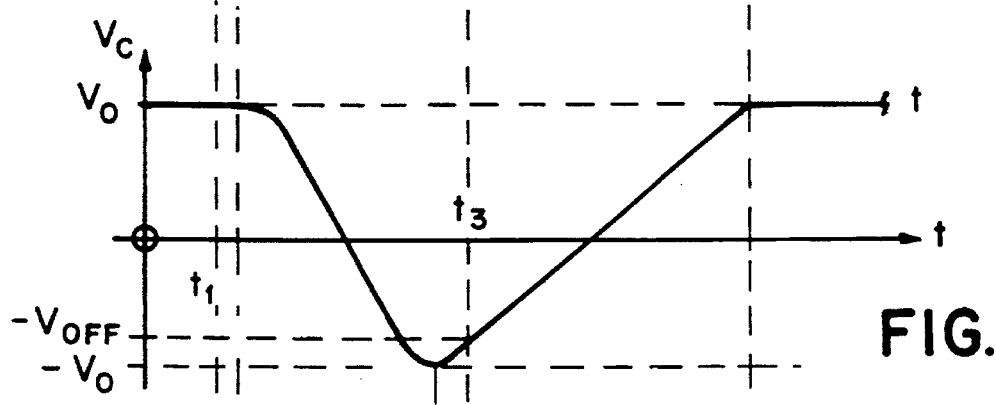
Figure 3C:
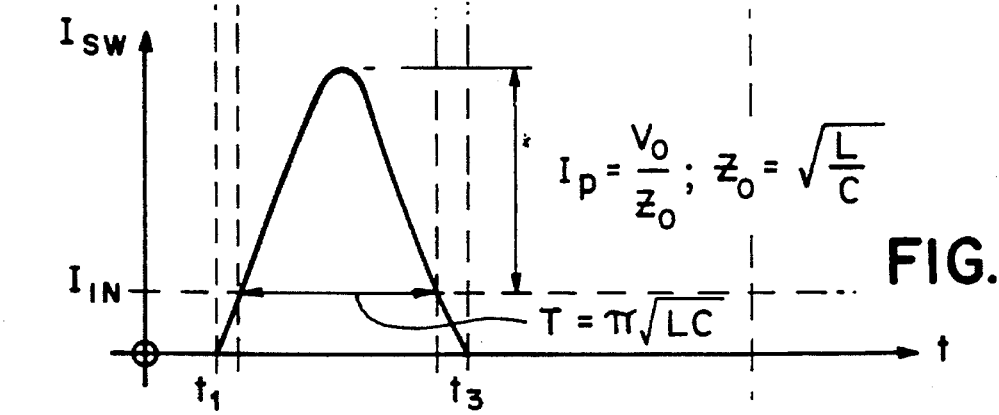
Figure 3D:
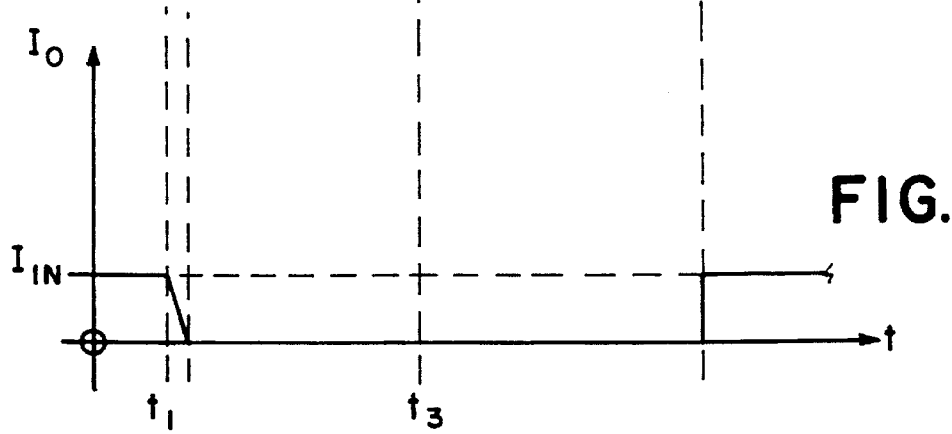

In operation, the bipolar switch 88 in the ZCS boost cell 81 is opened and closed at times of zero-current by a switch controller (not shown in the Figure, but described below) as a means of regulating the converter output voltage, or controlling the power factor that the converter presents to the input source, or both. The converter 80 may be operated in either the short-cycle mode, in which case the switch would be turned off at the first zero crossing of the current Isw following switch turn-on, or it may be operated in the long-cycle mode, in which case would be turned off at the second zero crossing following switch turn-on. If the controller is maintaining the load voltage at a value Vout then the waveforms for the boost cell 81 in the short-cycle mode will be essentially the same as those indicated in FIG. 3D, except that, at any particular instant in time, the polarities of the voltages and currents in the cell will change to correspond to the polarity of the voltage being delivered by the AC source. Thus, as the polarity of the AC source changes during each half-cycle, the polarities of Iin, Is and Io will also change. When polarity of the voltage delivered by the AC source results in a positive polarity for Vin (FIG. 9) then the flow of Iin, Io, Is, averaged over several converter operating cycles, will be in the directions indicated by the arrows in FIG. 9; when the polarity of the voltage delivered by the AC source results in a negative polarity for Vin (FIG. 9) then the flow of Iin, Io, Is, averaged over several converter operating cycles, will be in directions opposite to those indicated by the arrows in FIG. 9. When the polarity of Vin is positive, the pulsating current Io will flow through diodes 98 and 96 and the filter capacitor 99. The filter capacitor smooths the effect of the current pulsations and delivers an essentially DC voltage to the load 18. When the polarity of Vin is negative, the pulsating current Io will flow through diodes 92 and 94 and into the filter capacitor and load. In either case, the polarity of the current Iout will always be positive in the direction of the arrow.

One of the benefits of the AC-DC converter of FIG. 9 may be illustrated by comparing the relative losses in the converter of FIG. 9 to the losses in the prior art converter of FIG. 6A. In making the comparison, we assume that both converters have similar component values (e.g., the values of L1, L, C and Co in both converters are the same), that operating conditions for both converters are the same (e.g., input voltage; load), and that both are operating in the short-cycle mode. Under these circumstances, dissipative losses in non-ideal passive components (e.g., losses in parasitic resistances of L, L1, C, Co) will be essentially the same in each converter. The remainder of the circuit losses will occur in the semiconductor switches and diodes and, to compare losses, we will assume that each diode and switch has an essentially constant voltage drop, when conducting, of Vdd and Vdsw, respectively. FIG. 11 summarizes the total of the voltage drops, across switches and diodes, through which each current (Iin, Is and Io) flows in the converters of FIGS. 6A and 9 when operating in the short cycle mode. In all cases we refer to the average currents (and, in the case of the converter of FIG. 9, where the polarities of the average values of the currents Iin and Is will vary with the polarity of the AC source, we use the term "average" to mean the average value, over several operating cycle, of the absolute value of the current). As indicated in the Figure, in the prior art converter, the current Iin flows in two diodes (voltage drop equals 2Vdd; loss equals 2Vdd*Iin); the current Is flows in a diode and a switch (voltage drop equals Vdd+Vdsw; loss equals (Vdd+Vdsw)*Is); and the current Io flows in a single diode (voltage drop equals Vdd; loss equals Vdd*Io). For the converter of FIG. 9, Iin flows through no diodes; Is flows in a diode and a switch; Io flows in two diodes. Thus, in short cycle mode, the power loss in the prior art converter exceeds the loss in the converter of FIG. 9 in an amount equal to 2*Vdd*Iin−Vdd*Iout, where Iin and Iout are the average values of the currents. Using the ideal relationship between the average values of Iout and Iin (e.g., Iout=Iin*Vin/Vout), the reduction in overall loss can be closely approximated by Vdd*Iin*(2−Vin/Vo). For values of Vin small relative to Vo the converter of FIG. 9 exhibits a reduction in power loss which approaches 2*Vdd*Iin. It is noteworthy that this is equal to the entire loss in the rectifier 12 in the prior art converter of FIG. 8A. As Vin approaches Vout, the improvement approaches Vdd*Iin, or half of the total loss in the rectifier of FIG. 8A. In either case, the converter of FIG. 9 exhibits a reduction in overall loss of at least Vdd*Iin when compared to the prior art converter of FIG. 8A.

In an example of the efficiency improvement afforded by the invention, assume that the converters of FIGS. 6A and 9 are both operating as power factor correcting converters (e.g. the input current, Iin, is controlled to follow the waveform of the AC input source 60, which we will assume to be sinusoidal); both are delivering 600 Watts to a load, and both are operating from an 85 VAC, rms, AC input source. It can be shown that the average values of the converter currents, over one or more full cycles of the AC source, are closely approximated by: Iin=6.37 Amperes, Is=4.87 Amperes and Io=1.5 Amperes. With these values of currents, and assuming that each converter diode exhibits a voltage drop, Vdd, when conducting, equal to 1 volt, and that switches exhibit a voltage drop, Vdsw, when conducting, equal to 2 volts, the converter of FIG. 9 will exhibit a total semiconductor loss of 17.6 Watts compared to a total semiconductor loss of 28.9 Watts in the prior art converter of FIG. 8A. Thus, the converter of FIG. 9 will show a reduction in overall semiconductor losses, relative to the converter of FIG. 8A, equal to 11.3 Watts, which translates into a reduction in the amount of wasted heat generated by semiconductors of 39%.

(In general, the assumption that diodes and switches have constant voltage drops (e.g., Vdd, Vdsw) when conducting is used only as a simplification, since certain kinds of devices, such as FETs, do not behave as constant voltage devices. Thus, in any example herein in which a power loss of the kind "Vdd*Iz", or "Vdsw*Iz," is referenced it should be interpreted as representing the loss in a diode and a switch, respectively, associated with the flow of a current Iz, irrespective of the nature of the device. Comparisons between converters are made assuming that semiconductor diodes and switches in the converters being compared are of essentially the same kind.)

Figure 4A:
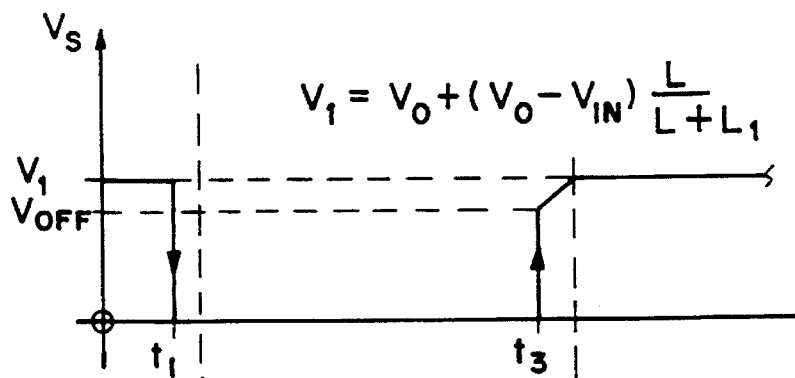
FIGS. 4A through 4D show waveforms for the converter of FIG. 2C operating in the long-cycle mode.
Figure 4B:
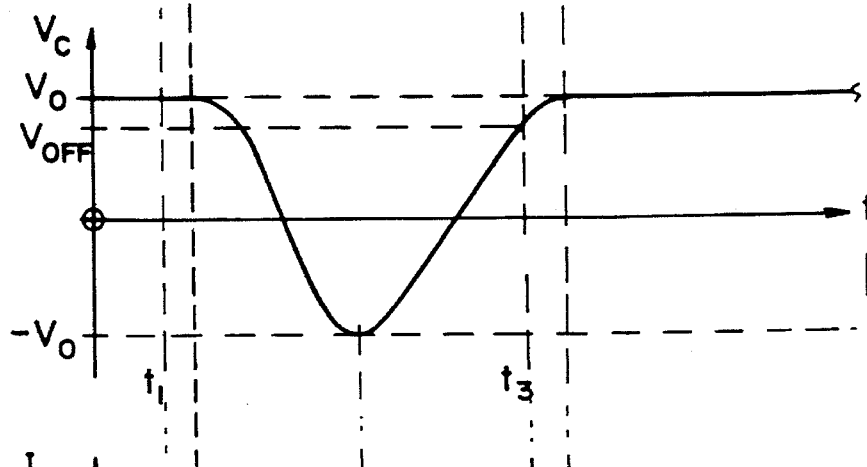
Figure 4C:
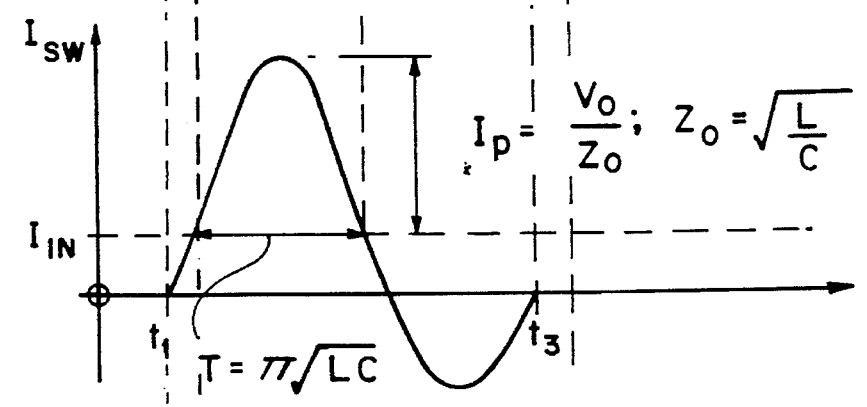
Figure 4D:
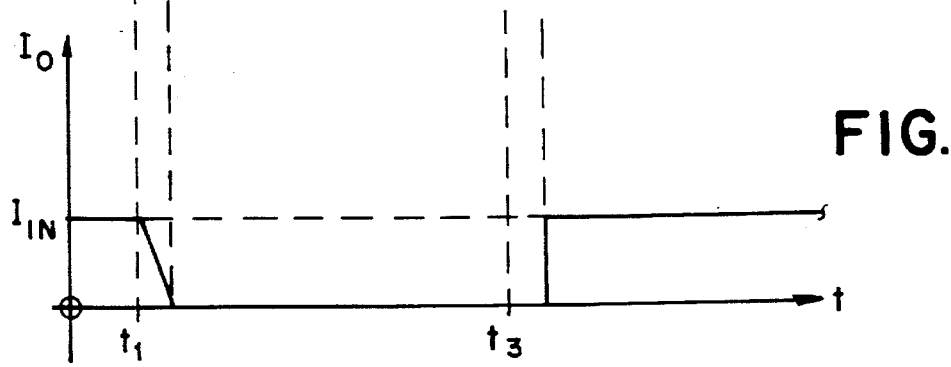

Because the ZCS converter 80 of FIG. 9 uses a bipolar switch 88, it may also be operated in the long-cycle mode. The waveforms in the ZCS boost cell 81 will be similar to those shown in FIG. 4 for the prior art converter of FIG. 2C. As noted earlier, however, the polarities of the waveforms will change to correspond to the polarities of the AC source (60, FIG. 9). The operating efficiency of such a converter may be compared to a prior art AC-DC converter operating in the long cycle mode. However, as also noted earlier, operation of the prior art converter in the long-cycle mode requires that the switch 27 of FIG. 8A be replaced with a switch of the kind shown in FIG. 5B to allow for current reversal in the switch during each converter operating cycle. A prior art ZCS boost converter 71, suitable for long-cycle operation, is shown in FIG. 8B. With the exception of the switch embodiment, the converter may be considered to be identical to the converter of FIG. 8A. FIG. 12 shows a comparison of the voltage drops which result in losses associated with the flows of currents Iin, Is and Io for the long-cycle converters using the same assumptions as those used in FIG. 11 for the short-cycle mode. Comparison of losses in the shunt path (e.g., losses associated with the flow of Is) is somewhat complicated by the fact that, during each converter operating cycle, the switch path current, Isw, flows in both directions and both the time duration and relative magnitudes of the forward and reverse current flows are dependent upon converter loading. With zero load, for example, the current Isw (FIGS. 4C, 8B, 9) will closely approximate a sinusoid which is symmetrical about zero current, as shown in FIG. 13A; at full load, which corresponds to the value of load beyond which zero-crossing can no longer occur, (FIG. 13B) the current returns to zero but does not reverse. In the prior art converter, positive flow of the current Is is carried by the switch (31, FIG. 8B), while negative flow is carried by the diode (33, FIG. 8B). In the converter of FIG. 9, both positive and negative flow are always carried by both a switch and a diode. Therefore, assuming that voltage drop in the switch, Vsdw, is greater than the drop in a diode, Vdd, the converter of FIG. 9 will always exhibit more losses in the shunt path than the prior art converter. However, this is more than made up for by the elimination of the losses associated with flow of Iin in two diodes in the prior art converter. In FIG. 12 the converters of FIGS. 8B and 9, operating in long-cycle mode, are compared at maximum loading, for which the net reduction in loss in the converter of FIG. 9 is equal to 2*Vdd*Iin–Vdd*Is–Vdd*Io. Since Iin=Is+Io, this reduces to a reduction in loss equal to Vdd*Iin. Using the same example given previously for a power factor correcting AC-DC boost converter (and assuming that the converters being compared are designed for a maximum power output close to 600 Watts), the converter of FIG. 9 will exhibit a total semiconductor loss of 17.6 Watts compared to a total semiconductor loss of 24 Watts in the prior art converter of FIG. 8B. Thus, the converter of FIG. 9 will show a reduction in overall semiconductor losses, relative to the converter of FIG. 8B, equal to 6.4 Watts, which translates into a reduction in the amount of wasted heat generated by semiconductors of 27%.

The AC-DC boost converter of FIG. 9 is one embodiment of a more general AC-DC boost conversion topology, referred to as a "fully integrated boost bridge converter," and shown in FIG. 14. In FIG. 14, the AC-DC converter system 100 includes a bipolar boost cell 81 and a full-wave rectifier 90. A bipolar voltage source 61 connects to the inputs 82a, 82b of the bipolar boost cell; the outputs 82c, 82d of the boost cell connect to the inputs 91a, 91b of the rectifier 90. The unipolar output of the rectifier connects to a load 18, which would typically include a filter capacitor 99. In general, the bipolar boost cell: (1) exhibits an inductive characteristic at its input terminals (as indicated by the equivalent input inductance 83, Leq); (2) includes a bipolar switching element, capable of supporting a bipolar voltage when off and capable of conducting a bipolar current when on, in a shunt path 85, which is opened and closed as a means of recirculating a portion of the input current, Iin, in the form of a shunt current, Is; and (3) includes a conductive path between the input source 61 and the load when the switch 88 is open. The polarities of the average values of the voltages and currents associated with the bipolar boost cell, Iin, Is, Io, and Vbo will be positive in the directions indicated in FIG. 14 when the polarity of the input voltage to the cell, Vin, is positive, and the polarities will be reversed when the polarity of Vin is negative. Placement of the rectifier ensures that the average values of both Vo and Iout are unipolar irrespective of the polarities of Iin, Io, Is and Vbo and also provides increased operating efficiency by eliminating rectification losses in paths which carry the full converter input current, Iin.

Examples of alternate embodiments of bipolar boost cells are shown in FIGS. 15A through 15G. FIG. 15A shows a PWM boost cell; FIGS. 15B shows a ZCS boost cell of the kind shown in the converter of FIG. 9; FIG. 15C shows another kind of ZCS boost cell in which the quasi-resonant inductor 97 is in series with the bipolar switching element 88. FIGS. 15D through 15F are seen to be "symmetrical" embodiments of the boost cell embodiments of FIGS. 15A through 15C. FIG. 15G shows a ZCS boost cell in which one of the inductances is symmetrized. It should be apparent from the Figure that a bipolar boost cell may be embodied using any prior-art shunt boost topology, whether PWM, ZCS, or Zero-Voltage Switching ("ZVS"), as is indicated in FIG. 14.

Figure 5A:
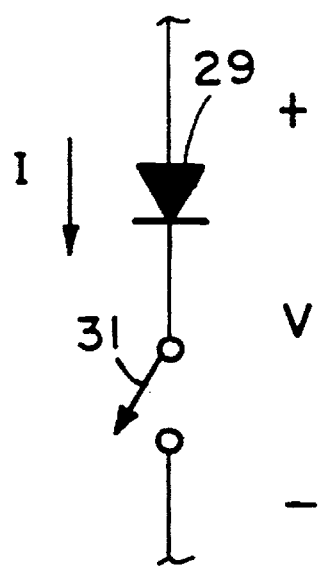
FIGS. 5A and 5B show switch embodiments for use in ZCS DC-DC boost switching power converters.
Figure 5B:
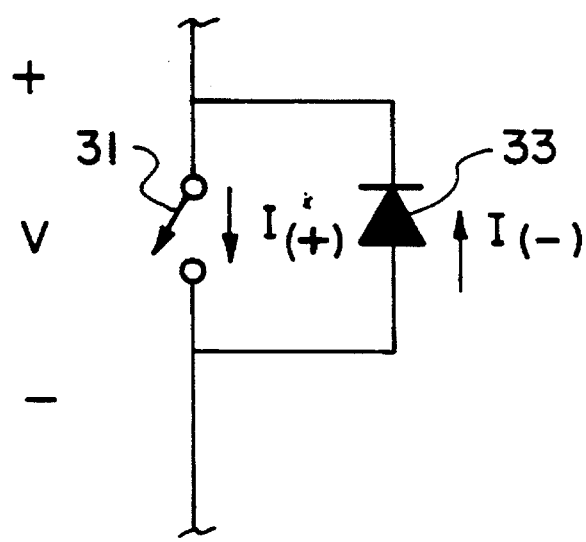

The structural features and operational advantages of the fully integrated AC-DC boost topology of FIG. 14 can be illustrated with reference to FIGS. 16A, 16B and 16C, which compare, respectively, the functional structures of: (1) a prior art AC-DC converter with independent rectification and power processing (e.g., of the kind shown in FIGS. 6C and 6D, referred to hereafter as an "independent" converter) 500, (2) an integrated prior art AC-DC boost converter (e.g., of the kind shown in FIG. 6F) 520, and (3) a fully integrated AC-DC boost converter (e.g., of the general kind shown in FIG. 14) 540. Each Figure shows only those elements in each converter topology which are involved in power processing or rectification when the bipolar input source 502 voltage, Vin, is positive. For a negative source voltage, the polarities of semiconductors, and the directions of current flow, would be reversed. In all cases the switches 504, 50%, 508 are meant simply to represent a generalized shunt path (which includes a switch) and are not meant to convey, or exclude, any particular switch topology (e.g., PWM, ZCS). Without any loss of generality we will also assume that the inductance 501 at the input of each converter is sufficiently large so that the input current, Iin, is essentially constant within the time frame of a converter operating cycle. In the "independent" converter of FIG. 16A, the "constant" input current, Iin, flows in two input diodes 62, 64, and a pulsating output current, Io, flows in a single diode 24. In the "integrated" converter of FIG. 16B, the constant input current flows in a single diode 604 and a pulsating output current, Io, flows in a single diode 602. In the "fully integrated" converter of FIG. 16C, the constant input current flows in no diodes and the pulsating output current flows in two diodes, 560, 561. The switches in the converters are also different. In the prior art converters 500, 520, depending on the specific topology used, the switches are either unidirectional (e.g., as in the PWM AC-DC converter of FIG. 6C), meaning that they can block a unipolar voltage when off and carry a unipolar current when on, or they are "bidirectional" (e.g., as illustrated in FIGS. 5A and 5B, and used, for example, in the ZCS converter of FIG. 6D or in the integrated PWM converter of FIG. 6F), meaning that they can either (1) block a bidirectional voltage when off but carry a unipolar current when on (FIG. 5A) or (2) carry a bidirectional current when on but block a unidirectional voltage when off (FIG. 5B). In a converter according to the present invention of the kind shown in FIG. 14, the switch is truly "bipolar": it can block a voltage of either polarity when off and carry a current of either polarity when on.

Converters according to the present invention are referred to as "fully integrated" not only because of their efficiency advantages but also because of their functional advantages—a plurality of fully integrated AC-DC boost converters can be combined into arbitrarily large arrays in which each individual converter will share predictably both in the power it delivers to the load and in the current which it both withdraws and returns to the input source. This advantage, which is a direct result of the topological structure of the fully integrated converter, is explained with reference to FIGS. 17A, 17B, and 17C.

In each of the Figures, an array 550, 552, 554 consisting of two converters is shown connected to a common bipolar input source 502 and load 66. Each of the converters in each array has the same complement of components, with components in the converter pairs differentiated by the letters "a" and "b." Each of the converters in each array is represented by its respective functional schematic of FIGS. 16A, 16B and 16C, with one difference: in each converter the single input inductor 501 of FIGS. 16A, 16B and 16C is replaced with a pair of inductors 505, 507, one of the pair of inductors 505 being connected to carry current, Iin, into the converter (as was inductor 501) and the other inductor 507 being connected in the return path which carries Iin back to the input source. We again presume, without loss of generality, that the sum total of the inductances 505, 507 at the inputs of each converter in each array is sufficiently large so that the input current, Iin, is essentially constant within the time frame of a converter operating cycle. The converters in each array are also presumed to be operating in a power-sharing mode: for ZCS converters this implies that both converters in each array are operating in the short-cycle mode and are synchronized to the same operating frequency; in the case of PWM converters, other known methods are used to force the converters to share in the current delivered to the load. Thus, the currents Iina and Iinb, in inductors 505a, 505b in each converter in each array, are essentially equal; the currents Ioa and Iob are essentially equal; and so too are the currents Isa and Isb.

As noted earlier, with respect to FIG. 7, and as indicated again in FIG. 17A, in an array of independent converters 550 the output and shunt currents combine into the essentially constant current Iin prior to being returned to the load via the rectifiers 62a, 62b and inductors 507a, 507b. Thus, while the sum of the currents, Ira+Irb, in the return paths is equal to Iina+Inb, the values of the individual currents, Ira, Irb, will be strongly dependent upon the characteristics of the individual rectifiers 62a, 62b (and the parasitic resistances of the inductors 507a, 507b) used in the two converters in the array. This unpredictability in the amount of current carried by a rectifier in the return path in a particular converter makes array operation problematical, or, in the case of large arrays, essentially impossible. The same situation is true in an array of integrated converters 552, as shown in FIG. 17B. Again, the root cause is that the currents Ioa, Iob, Isa and Isb are combined into the constant current Iin prior to flowing back to the source via the return paths, so the return currents, Ira and Irb, are dependent upon the rectifiers and parasitic resistances of the inductive elements in the paths.

In the array of fully independent converters 554, the currents Ioa, Iob, Isa and Isb are not mixed prior to flowing in the return inductors 507a, 507b. Rather, the currents Ioa and Isa return only to inductor 507a and the currents Iob and Isb return only to inductor 507b. Thus, each return current, Ira and Irb, is equal to its respective input current, Iina and Iinb, and there is essentially no unpredictability in how much current any particular converter in an array may need to carry back to the input source 502. Looked at from a circuit dynamics viewpoint, the current sharing process can also be explained as follows: when the switch (e.g., switch 508a) in a fully independent converter is closed, all of the diodes (e.g., diodes 560a, 561a) in the converter cease conducting and both inductors 505a, 507a must carry the same current Iin. This sets up an initial condition in inductor 507a such that, after the switch is opened and the current Iin commutates to the output to flow as current Io, this current is forced to flow back through diode 561a at a value Iin. This predictability in current sharing allows arbitrarily large arrays of fully independent converters to be constructed and is an important advantage of this kind of converter.

Thus, any fully integrated bridge boost converter of the kind shown in FIG. 14 can be adapted for operation within an array by simply arranging its bipolar boost cell (81, FIG. 14) so that a portion of the cell's equivalent input inductance (e.g., inductance 83, FIG. 14) is in each of the conductive paths between the cell input and output (e.g., in FIG. 14, a portion of the cell's input inductance 83 would be in the conductive path between boost cell input terminal 82a and boost cell output terminal 82c and the other portion would be between terminals 82b and 82d. The "symmetrical" bipolar boost cells of FIGS. 15D through 15F are examples of boost cells having inductance in both input to output paths. However, cells need not be completely symmetrical. For example, the values of the two input inductances need not be the same. Also, it is the presence of the inductance in each input-to-output path in the bipolar boost cell that matters, and this inductance can be provided by means other than the equivalent input inductance—for example, in FIG. 15G a ZCS bipolar boost cell 81 has a single discrete input inductance, L1, but has its quasi-resonant inductance, L, apportioned into two discrete inductances which are in the two input-to-output paths within the cell.

An alternate ZCS AC-DC boost converter (which is topologically of the "integrated" kind, and is not "fully integrated") which exhibits comparable efficiency to that exhibited by the converter of FIG. 9 in the long-cycle operating mode at full load, and higher efficiency at less than full load, is shown in FIG. 18. In the Figure, the converter 110 includes an input inductor 102 in series with the bipolar input source 60. The current, Iin, flowing in the input inductor 102 flows into two symmetrical boost cells 101a, 101b. The first cell 101a includes inductor 104a, capacitor 106a, unidirectional switch 108a and diodes 110a, 112a. The second cell 101b includes inductor 104b, capacitor 106b, unidirectional switch 108b and diodes 110b, 112b. The values of the inductors 104a, 104b and capacitors 106a, 106b, L and C respectively, determine the characteristic time constant of the sinusoidal rise and fall of the currents and voltages within the cell. The unidirectional switches 108a, 108b and their companion diodes 110a, 110b form a switch of the kind shown in FIG. 5B: when closed the unidirectional switches can conduct a current, Isw, in the direction indicated by the arrows; when open the switch can block a voltage, Vs, having a positive polarity as indicated in the Figure and the diode can conduct a reverse flow of the current Isw. One of the benefits of the converter structure of FIG. 18 is that the switches 108a, 108b are referenced directly to one side of the load, which allows for simplification of control circuitry (discussed below) by eliminating the need for floating switch drivers. In operation, when the voltage delivered by the bipolar source 60, Vin, is positive in the direction indicated in the Figure, cell 101a processes power for delivery to the load. Waveforms for Vs, Isw, Vc and Io are as shown in FIG. 4. The values of the inductors 104a, 104b and capacitors 106a, 106b, L and C respectively, determine the characteristic time constant of the sinusoidal rise and fall of the currents and voltages within the cell. The pulsating output current, Io, flows in diodes 112a, 110b and the filter capacitor 99. The filter capacitor smooths the effects of the pulsating current and delivers an essentially DC voltage to the load 18. When the voltage delivered by the bipolar source 60, Vin, is of negative polarity, cell 101b processes power for delivery to the load. In this case, the pulsating output current, Io, flows in diodes 112b, 110a. An alternate embodiment of the converter of FIG. 18, in which the inductors 104a, 104b are place in series with the switch, is shown in FIG. 19.

FIG. 18 also shows the total of the voltage drops, across switches and diodes, through which each average current (Iin, Is and Io) flows in the converters of FIGS. 18 and 19 when operating in the long cycle mode. The reduction in loss, compared to the prior art converter of FIG. 8B operating in the long-cycle mode at full load (FIG. 12), amounts to Vdd*In, which is the same as the full-load loss reduction exhibited by the converter of FIG. 9. Thus, using the same example given previously for a power factor correcting AC-DC boost converter (and assuming that the converters being compared are designed for a maximum power output close to 600 Watts), the converters of FIGS. 18 and 19 will exhibit a total semiconductor loss of 17.6 Watts compared to a total semiconductor loss of 24 Watts in the prior art converter of FIG. 8B. Thus, the converters of FIGS. 18 and 19 will show a reduction in overall semiconductor losses, relative to the converter of FIG. 8B, equal to 6.4 Watts, which translates into a reduction in the amount of wasted heat generated by semiconductors of 27%. However, as note earlier with respect to FIG. 13, as the load is reduced, and current reversal occurs during the converter operating cycle, the converter of FIG. 9 will continue to exhibit a total average semiconductor loss in its shunt path equal to Is*(Vdsw+Vdd), whereas overall loss in the parallel combination of the switch and diode (e.g., 108a, 110b, FIG. 18) in the converter of FIG. 18 will be reduced.

AC-DC boost converters according to the present invention, as exemplified in FIGS. 7, 14, 15, 18 and 19, share an efficiency advantage over prior art AC-DC converters. At full load, they all provide a reduction in loss, compared to prior art AC-DC boost converters, in an amount equal to or greater than Vdd*Iin, where, in general, Vdd*Iin is representative of the power loss in an input rectifier diode in a prior art converter (e.g., a converter in which a full-wave rectifier is interposed between a bipolar input source and a DC-DC shunt converter) and Iin is the average current drawn by the AC to DC converter from the input source. Of primary interest are the ZCS AC-DC boost configurations, since the absence of any significant switching losses and diode recovery losses in these converters makes them inherently more efficient than PWM implementations. In ZCS AC-DC converters, selection of configurations which are most appropriate to a particular operating mode (e.g., for the short-cycle mode, the converter of FIGS. 14 with any of the ZCS bipolar boost cells 81 of FIGS. 15B, 15C, 15E, 15F, 15G; for the long-cycle mode either of the ZCS AC-DC converters shown in FIGS. 18 and 19) the reduction in loss will, on average, be greater than Vdd*Iin at any value of loading, and, depending upon operating conditions, can approach 2*Vdd*Iin.

An exemplary embodiment of a ZCS AC-DC boost switching power converter, of the kind shown in FIG. 14, is shown in FIG. 20. The circuit is designed to deliver in excess of 600 Watts to a load, at an output voltage of 400 Volts, DC, when operating from ordinary AC utility lines (47 to 63 Hz) at input source 201 voltages, Vac, between 85 Volts, rms, and 264 V, rms. A controller (not shown in the Figure, but described below) enables and disables the switch, at times of zero current, at a rate consistent with providing both input power factor correction and output voltage regulation. In such an application, the peak power processed by the converter is approximately 1200 Watts (at the peak of the AC line and at full load). The converter is operated in the short-cycle mode. In the Figure, the converter 200 corresponds to the converter 100 of FIG. 14 incorporating both the bipolar boost cell of FIG. 15E and the bipolar switch embodiment 88 of FIG. 10. The total input inductance, comprising inductors 202, 204 in series with the AC input source 201, is L1=200 microhenry. The total value of L, comprising inductors 206, 208, is 10 microhenry. The value of C 210 is 6800 picofarads. The diodes 216–218 may be any high voltage ultrafast rectifiers having a breakdown voltage rating in excess of 400 Volts and rated to carry the average converter output current (e.g., Motorola part MUR 450). The same devices may be used for the diodes 220, 222 in the bipolar switch 88. The IGBTs 224, 226 are ultrafast devices with breakdown voltage rating in excess of 400 Volts and a pulsed current rating greater than Ip+Iinmax (FIG. 3C), where Ip=Vo/[sqrt(L/C)]=10.4 amperes, and Iinmax is the maximum value of (average) converter input current, Iin, (which occurs at the peak of an 85 V, rms line (e.g., 120 V, peak), at a power level of 1200 Watts) equal to 10 Amperes. A single International Rectifier IRGBC30U IGBT is suitable for this application. In operation, the converter operating frequency range, over the full range of AC source voltages, and from no load to full load, is approximately 15 KHz to 500 KHz. Conversion efficiency with in input source voltage at, or above, 85 VAC, rms, and a load of 600 Watts, is in excess of 94%.

With respect to controlling the output voltage, Vo, (and the waveform of the input current, Iin, in the case of power factor corrected conversion), a block diagram of a controller 299 which can be used in ZCS embodiments of any of the converters of FIGS. 9, 14, 18, 19 and 20 is shown in FIG. 21A. In the Figure, the controller 299 includes an error amplifier 300, a voltage-to-frequency converter 302, a ZCS controller (e.g., of the kind described in Vinciarelli, "Boost Switching Power Conversion," U.S. Pat. No. 5,321,348, incorporated by reference), an on-off pulse generator 306, and an isolated floating gate driver 308 (e.g., of the kind described in Vinciarelli, "High Efficiency Floating Gate Driver Circuit Using Leakage Inductance Transformer," U.S. patent application Ser. No. 07/805,474, incorporated by reference). The output of the floating gate driver 308 is connected to the control the switch, or switches, used in the converter (e.g., the output can generate the gate drive voltage, Vg, shown in FIG. 10) The error amplifier 300 accepts an input 310, indicative of the actual converter output voltage, Vo, and compares it to a reference voltage 312, Vref, indicative of some desired setpoint value of converter output voltage, Vout. The error amplifier might also include power factor correction control circuitry for controlling the converter input current, Iin, to follow the waveform of the converter input voltage, Vac, as indicated by the additional inputs 314, 316. In any case, the output of the error amplifier, Ve, will increase if Vo decreases below the desired setpoint value and decrease if Vo increases above the desired setpoint value (likewise, the voltage Ve will indicate divergence of the waveform of Iin from that of Vac, in the case of a power factor correcting controller). The error voltage, Ve, is delivered to the voltage-to-frequency converter 302, which delivers a pulsed signal 320 whose frequency sets the operating frequency of the converter. An increase in Ve produces an increase in frequency, and vice versa. Each pulse produced by the voltage-to-frequency converter initiates a controller pulse 322 from the ZCS controller 304, which, in turn, initiates a turn-on pulse 325 from the on-off pulse generator 306. The turn-on pulses 325 cause the isolated output 330 of the floating gate driver to go high, turning on the switch, or switches, in the converter. When the switch current 329, Isw, returns to zero, the ZCS controller terminates the controller pulse 322 and this, in turn, initiates a turn-off pulse 327 from the on-off pulse generator. The turn-off pulses 327 cause the output of the floating gate driver to go low, disabling the switch, or switches in the converter.

A controller 350 for PWM embodiments of the invention (e.g., the converter of FIG. 14 incorporating a bipolar boost cell 81 of the kinds shown in FIGS. 15A and 15D) is shown in FIG. 21B. In the Figure, both the on/off pulse generator 306 and the floating gate driver are the same as those described above with reference to FIG. 21A. A duty-cycle controller 321, which accepts an input 310, indicative of the actual converter output voltage, Vo, and compares it to a reference voltage 312, Vref, indicative of some desired setpoint value of converter output voltage, Vout, delivers a pulse train 323 to the input of the on/off pulse generator. The duty-cycle controller 321 adjusts the duty-cycle of the pulse train 323 (e.g., the fraction of the time during a converter operating cycle that the switch is turned on) as a means of maintaining the output voltage at the desired setpoint value. The duty-cycle controller might also include power factor correction control circuitry for controlling the converter input current, Iin, to follow the waveform of the converter input voltage, Vac, as indicated by the additional inputs 314, 316. A wide variety of such controllers are described in the art, including a complete monolithic power factor correcting controller integrated circuit 14, sold as Part No. UC1854 by Unitrode Integrated Circuits, Merrimack, N.H., U.S.A.

Other embodiments are within the scope of the following claims. For example, filter elements (e.g., inductors, capacitors) for reducing the extent to which conducted noise flows back toward the input source may be placed between the bipolar source and the input to the AC-DC boost converter.

Other embodiments are also within the scope of the following claims.

What is claimed is:

1. An AC-DC boost switching power converter for delivering power from an input voltage source of either polarity to a load at a unipolar load voltage, comprising an input inductive element for receiving an input current, Iin, of either polarity, from said input source, a bipolar switch, capable of (a) blocking a voltage of either polarity when off, (b) conducting a current of either polarity when on, and (c) being turned off while carrying current, said bipolar switch providing a shunt path for returning a shunt current of either polarity, Is, to said input source, conduction paths for delivering a unipolar output current, Io, to said load, a controller for turning said bipolar switch on and off during each of a series of converter operating cycles.

2. The converter of claim 1 further comprising circuit elements connected to enable turning said bipolar switch on at zero current and for causing current in said bipolar switch subsequently to return to zero.

3. The converter of claim 2 wherein said circuit elements comprise a second inductive element, of value L, and a capacitor, of value C, said circuit elements defining a characteristic time constant, T=pi*sqrt(L*C), for variations in the current which flows in said bipolar switch during each of said operating cycles.

4. The converter of claim 2 wherein said controller turns said bipolar switch on and off at times of essentially zero current.

5. The converter of claim 1 wherein said controller controls the fraction of each operating cycle during which said bipolar switch is turned on.

6. The converter of claim 1 wherein said input inductive element and said bipolar switch are included in a bipolar boost cell having a pair of input terminals for connection to said input voltage source and a pair of output terminals for delivering current to said load via said conduction paths.

7. The converter of claim 6 wherein said bipolar boost cell comprises a PWM bipolar boost cell.

8. The converter of claim 6 wherein said bipolar boost cell comprises a ZCS bipolar boost cell.

9. The converter of claim 6 wherein said bipolar boost cell comprises a ZVS boost cell.

10. The converter of claim 6 wherein said bipolar boost cell comprises a series circuit including a first inductance in series with said bipolar switch, said series circuit being connected between said pair of input terminals, the ends of said bipolar switch being connected to said pair of output terminals.

11. The converter of claim 6 wherein said bipolar boost cell comprises a first series circuit comprising a first inductance in series with said bipolar switch, said first series circuit being connected between said pair of input terminals, and a second series circuit comprising a second inductance and a capacitor, said second series circuit being connected across said bipolar switch, the ends of said capacitor being connected to said pair of output terminals.

12. The converter of claim 6 wherein said bipolar boost cell comprises a first series circuit comprising a first inductance in series with a capacitor, said first series circuit being connected between said pair of input terminals, the ends of said capacitor being connected to said pair of output terminals, and a second series circuit comprising a second inductance in series with said bipolar switch, said second series circuit being connected across said capacitor.

13. The converter of claims 10, 11, or 12 wherein said first inductance comprises more than one inductor, at least one of each of said inductors being connected to a different one of said pair of input terminals.

14. The converter of claims 11 or 12 wherein said second inductance comprises inductors respectively connected to different ends of said capacitor.

15. The converter of claims 11 or 12 wherein said bipolar boost cell comprises a ZCS bipolar boost cell, and the value, L, of said second inductance, and the value, C, of said capacitor define a characteristic time constant, $T=pi*sqrt(L*C)$, for variations in the current which flows in said bipolar switch during each said operating cycle.

16. The converter of claims 1 or 6 wherein said conduction paths comprise unidirectional conduction devices.

17. The converter of claim 16 wherein said input current, Iin, does not flow in any of said unidirectional conduction devices and said output current, Io, flows in no more than two of said unidirectional conduction devices.

18. The converter of claim 17 wherein said unidirectional conduction devices comprise a full-wave rectifier having inputs for accepting an electrical input of either polarity and outputs for delivering a unipolar output to said load.

19. The converter of claim 1 wherein said input voltage source comprises an AC source which delivers a time-varying bipolar voltage.

20. The converter of claim 1, further comprising a bipolar boost cell comprising an input inductance connected in series with said bipolar switch and said input source, a series circuit connected across said bipolar switch, said series circuit comprising a second inductance, of value L, in series with a capacitor, of value C, said second inductance and said capacitance defining a characteristic time constant, $T=pi*sqrt(L*C)$ for the sinusoidal rise and fall of currents and voltages in said bipolar boost cell during each said operating cycle, and wherein said conduction paths comprise first and second unidirectional conduction devices, each having a first end connected to a first end of said load and each being poled to carry current in a direction toward said load, the other end of said first unidirectional device being connected to a first end of said capacitor, the other end of said second unidirectional conduction device being connected to the other end of said capacitor, a third and a fourth unidirectional conduction device, each having a first end connected to the other end of said load and each being poled to carry current in a direction away from said load, the other end of said first unidirectional device being connected to a first end of said capacitor, the other end of said second unidirectional conduction device being connected to the other end of said capacitor, and wherein said controller controls the opening and closing of said bipolar switch to occur at times of zero current during a series of converter operating cycles.

21. The converter of claim 20 wherein said input inductance comprises inductors connected respectively between each end of said switch and each end of said input source.

22. The converter of claim 20 wherein said second inductance comprises inductors connected respectively to different ends of said capacitor.

23. The converter of claims 3, 8, 11, 12, or 20 wherein said controller is arranged to turn said switch off at essentially the first instant in time, following the time that said switch is turned on, that the current in said switch returns to zero.

24. The AC-DC boost switching power converter of claim 1, further comprising a shunt current waveform describing an instantaneous value of the shunt current, a bipolar voltage waveform describing an instantaneous voltage across the bipolar switch, for the load having a fixed value and for the input voltage source producing an input voltage having a fixed absolute value, the shunt current waveform for a first polarity of input voltage will be substantially the same as the shunt current waveform for a second polarity of input voltage opposite the first polarity, except the polarity of the shunt current waveform for the first polarity of input voltage will be opposite that of the shunt current waveform for the second polarity of input voltage opposite the first polarity, and for the load having a fixed value and for the input voltage source producing an input voltage having a fixed absolute value, the bipolar voltage waveform for a first polarity of input voltage will be substantially the same as the bipolar voltage waveform for a second polarity of input voltage opposite the first polarity, except the polarity of the bipolar voltage waveform for the first polarity of input voltage will be opposite that of the bipolar voltage waveform for the second polarity of input voltage opposite the first polarity.

25. An AC-DC boost switching power converter for delivering power from an input voltage source of either polarity to a load at a unipolar load voltage, comprising an input circuit having an input inductance connected in series with said input source, two boost cells, each cell comprising, a switch, a second inductance, of value L, having a first end connected to a first end of said switch, a capacitor, of value C, connected between the second end of said second inductance and the second end of said switch, a diode having a first end connected to said second end of said second inductance, the second ends of both of said diodes of said two boost cells being connected to one end of said load and the second ends of said switches of said two boost cells being connected to the other end of said load, and a controller for controlling the opening and closing of said switches to occur at times of zero current during a series of converter operating cycles, said second inductance and said capacitance define a characteristic time constant, $T=pi*sqrt(L*C)$ for the sinusoidal rise and fall of currents and voltages in each of said bipolar boost cells during each said operating cycle.

26. The converter of claims 3, 8, 11, 12, 20, or 25 wherein said controller is arranged to turn said switch off at essentially the second instant in time, following the time that said switch is turned on, that the current in said switch returns to zero.

27. The converter of claims 3, 8, 11, 12, 20, or 25 wherein said controller maintains said unipolar load voltage at a predetermined setpoint value.

28. The converter of claims 3, 8, 11, 12, 20, or 25 wherein said controller controls a waveform of said bipolar input current to follow a waveform of said input voltage source.

29. The converter of claim 1 wherein said bipolar switch comprises a pair of unipolar switching devices, each said unipolar switching device being capable of withstanding a unipolar voltage when turned off, the polarity of said unipolar voltage defining positive and negative poles on each said switch, each said switch being capable of carrying a unipolar current, when turned on, between said positive and negative poles, said switches being connected in series in polar opposition to each other, and a pair of unidirectional conduction devices, one of each of said devices being connected in parallel with one of each of said unipolar switches, said unidirectional conduction devices being poled to conduct current in a direction opposite to that of the unipolar switch across which it is connected.

30. The bipolar switch of claim 29 wherein said unipolar switching device comprises an insulated gate bipolar transistor.

31. The converter of claim 25 wherein said said input circuit is connected between said first ends of said second inductances.

32. The converter of claim 25 wherein said input circuit is connected between said second ends of said second inductances.

33. The converter of claim 25 wherein each of said switches comprises, a unipolar switching device capable of withstanding a unipolar voltage when turned off, the polarity of said unipolar voltage defining positive and negative poles on said switch, and capable of carrying a unipolar current, when turned on, between said positive and negative poles, and a first unidirectional conduction device connected in parallel with said unipolar switch, said first unidirectional conduction device being poled so that it conducts current in a direction opposite to that of said unipolar switch.

34. An AC-DC boost switching power converter for delivering power from a bipolar input voltage source to a load at a unipolar load voltage comprising an input inductive element for receiving, from said source, a bipolar input current, the average value of the absolute value of which is Iin, a switch providing a shunt path for returning, to said source, a fraction of Iin as a bipolar shunt current, the average value of the absolute value of which is Is, unidirectional conduction devices connected to deliver to said load a unipolar output current, of average value Io=Iin−Is, a controller for turning said switch on and off during each of a series of converter operating cycles, said switch and said unidirectional conduction devices being connected so that said input current, Iin, does not flow in any of said unidirectional conduction devices and said output current, Iout, flows in no more than two of said unidirectional conduction devices.

* * * * *